(12) United States Patent
An et al.

(10) Patent No.: US 9,632,235 B2
(45) Date of Patent: Apr. 25, 2017

(54) LIGHT GUIDE PLATE SUPPORT STRUCTURE FOR DISPLAY APPARATUS

(71) Applicant: SAMSUNG ELECTRONICS CO., LTD., Suwon-si (KR)

(72) Inventors: Jun Seok An, Suwon-si (KR); Jun-Mo Yoo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/932,278

(22) Filed: Nov. 4, 2015

(65) Prior Publication Data

US 2016/0291242 A1    Oct. 6, 2016

(30) Foreign Application Priority Data

Mar. 31, 2015 (KR) .................. 10-2015-0045075

(51) Int. Cl.
| | | |
|---|---|---|
| G02F 1/13357 | (2006.01) | |
| F21V 19/00 | (2006.01) | |
| F21V 8/00 | (2006.01) | |
| G02F 1/1333 | (2006.01) | |

(52) U.S. Cl.
CPC .......... *G02B 6/0088* (2013.01); *G02B 6/005* (2013.01); *G02B 6/009* (2013.01); *G02B 6/0073* (2013.01); *G02B 6/0091* (2013.01); *G02F 1/133308* (2013.01); *G02B 6/0036* (2013.01); *G02B 6/0038* (2013.01); *G02B 6/0061* (2013.01); *G02B 6/0065* (2013.01); *G02F 2001/13332* (2013.01); *G02F 2001/133314* (2013.01);

(Continued)

(58) Field of Classification Search
CPC .......... G02F 1/133615; F21V 19/0035; F21V 2200/20
See application file for complete search history.

(56) References Cited

U.S. PATENT DOCUMENTS

| | | | | | |
|---|---|---|---|---|---|
| 5,831,697 A | * | 11/1998 | Evanicky | .......... | G02F 1/133615 348/E5.135 |
| 5,986,727 A | * | 11/1999 | Fukui | ................ | G02F 1/133615 349/61 |

(Continued)

FOREIGN PATENT DOCUMENTS

| | | |
|---|---|---|
| EP | 2437105 A1 | 4/2012 |
| EP | 2500765 A1 | 9/2012 |

(Continued)

OTHER PUBLICATIONS

International Search Report, issued by International Searching Authority in corresponding International Application No. PCT/KR2015/014170, mailed on May 27, 2016. (PCT/ISA/210).

(Continued)

*Primary Examiner* — Ismael Negron
(74) *Attorney, Agent, or Firm* — Sughrue Mion, PLLC

(57) ABSTRACT

A display apparatus includes a display panel, a light source unit including a light source configured to generate light and a light source supporting unit on which the light source is disposed, and a light guide plate disposed at a rear portion of the display panel and transmitting the light generated by the light source toward the display panel. The light source supporting unit is disposed to support at least one portion the front surface of the light guide plate.

14 Claims, 35 Drawing Sheets

(52) U.S. Cl.
CPC ............ *G02F 2001/133317* (2013.01); *G02F 2201/46* (2013.01)

(56) References Cited

U.S. PATENT DOCUMENTS

| | | | | |
|---|---|---|---|---|
| 7,184,007 | B2* | 2/2007 | Tsai | G02F 1/133615 345/1.1 |
| 7,237,938 | B2* | 7/2007 | Wang | G02F 1/133615 362/606 |
| 8,373,823 | B2* | 2/2013 | Heo | G02F 1/133615 349/56 |
| 8,439,551 | B2* | 5/2013 | Cho | G02F 1/133615 362/609 |
| 8,502,933 | B2* | 8/2013 | Park | G02F 1/133615 349/58 |
| 8,508,685 | B2* | 8/2013 | Lee | G02F 1/133608 349/58 |
| 2004/0004424 | A1 | 1/2004 | Sakurai | |
| 2005/0030444 | A1* | 2/2005 | Fujiwara | G02F 1/133615 349/64 |
| 2008/0013337 | A1* | 1/2008 | Lien | G02B 6/0031 362/600 |
| 2009/0096957 | A1* | 4/2009 | Hiyama | G02F 1/133615 349/65 |
| 2009/0180052 | A1* | 7/2009 | Hsu | G02B 6/005 349/62 |
| 2010/0149835 | A1 | 6/2010 | Cho et al. | |
| 2011/0085107 | A1 | 4/2011 | Noh et al. | |
| 2011/0134359 | A1 | 6/2011 | An et al. | |
| 2012/0050634 | A1 | 3/2012 | Kim et al. | |
| 2012/0069263 | A1 | 3/2012 | Hur et al. | |
| 2013/0044271 | A1* | 2/2013 | Momose | G02F 1/133615 349/58 |
| 2013/0076696 | A1 | 3/2013 | Shin | |
| 2013/0107157 | A1 | 5/2013 | Yang et al. | |
| 2013/0155717 | A1 | 6/2013 | Jeong et al. | |
| 2014/0184926 | A1 | 7/2014 | Shimomichi | |
| 2015/0085221 | A1 | 3/2015 | Zhang et al. | |

FOREIGN PATENT DOCUMENTS

| | | |
|---|---|---|
| EP | 2789903 A1 | 10/2014 |
| KR | 10-2012-0118372 A | 10/2012 |
| KR | 10-1319543 B1 | 10/2013 |

OTHER PUBLICATIONS

Communication dated Jul. 28, 2016, from the European Patent Office in counterpart European Application No. 16152148.9.

* cited by examiner

588

FIG. 25
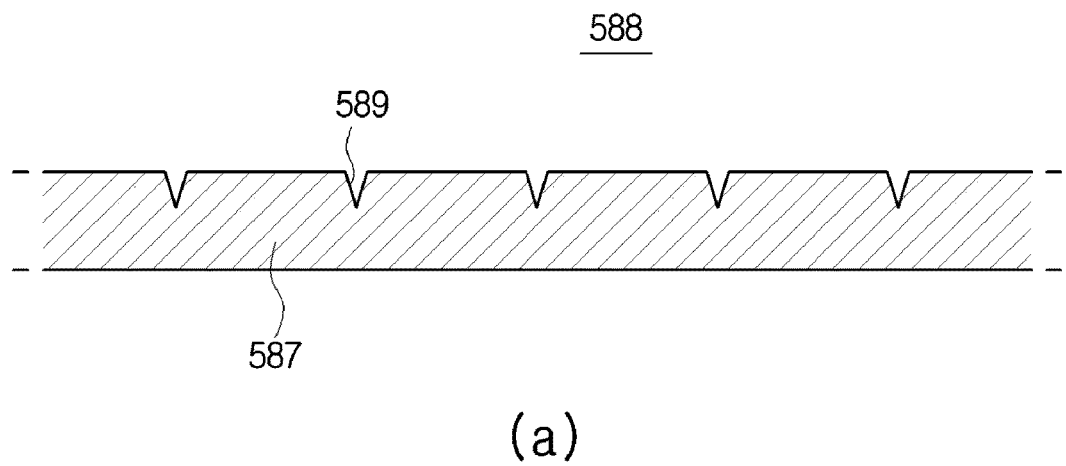
(a)
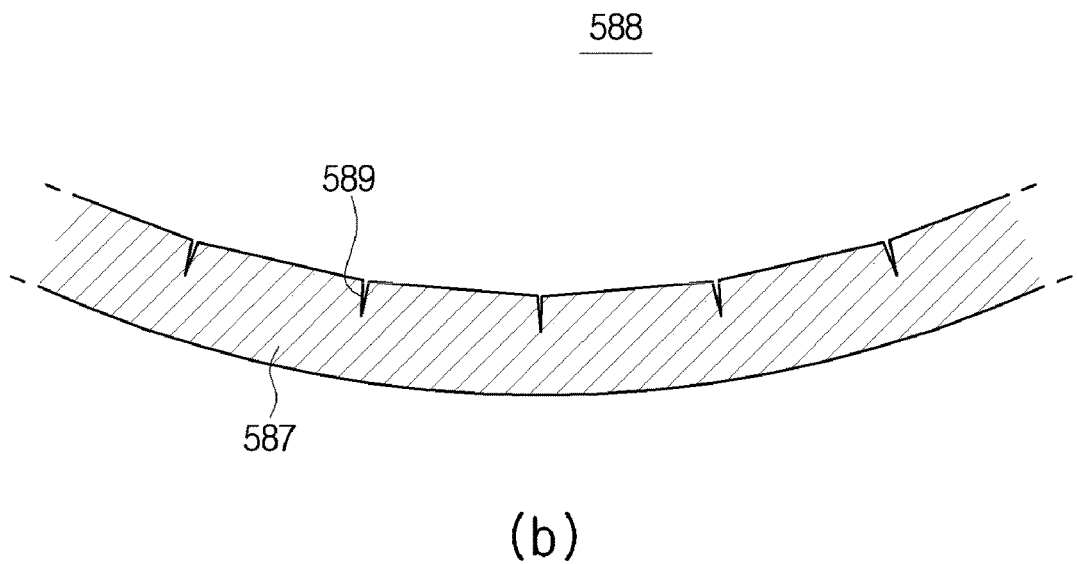
(b)

LIGHT GUIDE PLATE SUPPORT STRUCTURE FOR DISPLAY APPARATUS

CROSS-REFERENCE TO RELATED APPLICATION(S)

This application claims priority from Korean Patent Application No. 10-2015-0045075, filed on Mar. 31, 2015 in the Korean Intellectual Property Office, the disclosure of which is incorporated herein by reference.

BACKGROUND

1. Field

Apparatuses and systems consistent with exemplary embodiments relate to a display apparatus, and more particularly, to a display apparatus having a slim structure.

2. Description of the Related Art

Display apparatuses are devices that display an image on a screen. Examples of display apparatuses may include monitors and televisions. Self-emission type display panels such as an organic light-emitting diode (OLED) and light-receiving type display panels such as a liquid crystal display (LCD) may be used in display apparatuses.

However, there is a need to improve a structure and shape of the display apparatus to achieve a slim or thin design thereof while maintaining or improving functions and rigidity of the display apparatus.

SUMMARY

According to an aspect of an exemplary embodiment a display apparatus having a slim or thin design is provided.

According to an aspect of another exemplary embodiment, a display apparatus manufactured quickly and efficiently is provided.

According to an aspect of another exemplary embodiment, a display apparatus having an aesthetically appealing appearance is provided.

Additional aspects of the exemplary embodiments will be set forth in part in the description which follows and, in part, will be obvious from the description, or may be learned by practice of the exemplary embodiments.

According to an aspect of an exemplary embodiment, a display apparatus is provided. The display apparatus includes a display panel, a light source unit including a light source configured to generate light and a light source supporting unit on which the light source is disposed, and a light guide plate disposed at a rear portion of the display panel and configured to transmit the light generated by the light source toward the display panel, and the light source supporting unit supports at least one portion of a front surface of the light guide plate.

The display panel may be disposed to receive the light transmitted through a light transmitting surface of the light guide plate, and one surface of the light source supporting unit may support the display panel, and another surface of the light source may support the light guide plate.

The light source may be disposed on the other surface of the light source supporting unit.

The light source supporting unit may include a light guide plate supporting surface facing the light guide plate to support the light guide plate, and a supplementary member disposed on the light guide plate supporting surface to prevent light emitted from the light source from leaking through a gap between the light guide plate supporting surface and the light guide plate.

The supplementary member may be a heat insulation film.

The light source supporting unit may be a printed circuit board (PCB) configured to transmit an electric signal to the light source.

The display apparatus may further include a top chassis, a bottom chassis disposed at a rear portion of the light guide plate to support the light guide plate, and a side frame, at least one portion of which is disposed between the top chassis and the bottom chassis, and the top chassis may be coupled with the light source supporting unit and the side frame.

The bottom chassis may be integrally formed with the side frame.

The top chassis may include a panel supporting portion, and a top chassis coupling portion extending to be recessed relative to the panel supporting portion, and the top chassis coupling portion may be coupled with the side frame in a front-to-back direction without interfering with the bottom chassis.

The top chassis may include a panel supporting portion, and a top chassis coupling portion extending to be recessed relative to the panel supporting portion, and the top chassis coupling portion, the light source supporting unit, and the side frame may be sequentially disposed.

The top chassis coupling portion, the light source supporting unit, and the side frame may be fixed by screw-coupling.

The top chassis coupling portion may include an insertion space configured to receive a screw to couple to the top chassis coupling portion, the light source supporting unit, and a frame seating portion, the insertion space being recessed toward the bottom chassis relative to the panel supporting portion, and the display apparatus may further include a cover, at least one portion of which covers the insertion space, disposed on the front surface of the top chassis.

The cover may be formed of a magnetic material, and the display apparatus may further include a magnet inserted into the insertion space to allow the cover to be attached to the front surface of the top chassis.

The display apparatus may further include an optical sheet disposed between the light guide plate and the display panel to change optical properties of light transmitted from the light transmitting surface.

According to an aspect of another exemplary embodiment, a display apparatus is provided. The display apparatus includes a display panel, a light source unit including a light source configured to generate light and a light source supporting unit on which the light source is disposed, and a light guide plate configured to transmit the light generated by the light source toward the display panel, and the light source supporting unit may be disposed between the display panel and the light guide plate to support at least one selected from the group consisting of the display panel and the light guide plate.

According to an aspect of an exemplary embodiment, a display apparatus is provided. The display apparatus includes a light source unit configured to generate light, a light guide plate configured to transmit the light generated by the light source unit through a light transmitting surface, a display panel disposed to receive the light transmitted through the light transmitting surface, a top chassis including a panel supporting portion configured to support at least one portion of a front of the display panel and a top chassis coupling portion extending from the panel supporting portion, a bottom chassis disposed at a rear portion of the light guide plate, and a side frame, at least one portion of which is disposed between the bottom chassis and the top chassis.

The top chassis coupling portion may be coupled with the side frame in a front-to-back direction without interfering with the bottom chassis.

The bottom chassis may be integrally formed with the side frame.

The side frame may be fixed to the bottom chassis.

The light source unit may include a light source configured to generate light, and a light source supporting unit on which the light source is disposed, and the light source supporting unit may be coupled with the top chassis coupling portion and the side frame.

The top chassis coupling portion, the light source supporting unit, and the side frame may be sequentially disposed.

The side frame may include a frame body, and a frame seating portion, on which the light source supporting unit is seated, extending from the frame body, and the top chassis coupling portion, the light source supporting unit, and the frame seating portion may be fixed by screw-coupling.

The light source supporting unit may be a printed circuit board (PCB) configured to transmit an electric signal to the light source.

The top chassis coupling portion may include an insertion space configured to receive a screw to couple to the top chassis coupling portion, the light source supporting unit, and a frame seating portion, the insertion space being recessed toward the bottom chassis relative to the panel supporting portion, and the display apparatus may further include a cover, at least one portion of which covers the insertion space, disposed on the front surface of the top chassis.

The cover may be formed of a magnetic material, and the display apparatus may further include a magnet inserted into the insertion space to allow the cover to be attached to the front surface of the top chassis.

The cover may include a material selected from the group comprising a film, metal, and plastic.

According to an aspect of an exemplary embodiment, a display apparatus is provided. The display apparatus includes a light source unit configured to generate light, a light guide plate configured to transmit the light generated by the light source unit through a light transmitting surface, a display panel disposed to receive the light transmitted through the light transmitting surface, a top chassis including a panel supporting portion configured to support at least one portion of the front of the display panel and a top chassis coupling portion extending from the panel supporting portion, a bottom chassis disposed at a rear portion of the light guide plate to support the light guide plate, and a side frame, at least one portion of which is disposed between the bottom chassis and the top chassis, and integrally formed with the bottom chassis, and the top chassis coupling portion may be coupled with the side frame in a front-to-back direction without causing interference on the bottom chassis.

According to an aspect of an exemplary embodiment, a display apparatus is provided. The display apparatus includes a light source unit including a light source configured to generate light and a light source supporting unit configured to support the light source, a light guide plate configured to transmit the light generated by the light source unit through a light transmitting surface, a display panel disposed to receive the light transmitted through the light transmitting surface, a bottom chassis disposed at one surface of the light guide plate to support the light guide plate, a side frame disposed along a side of the bottom chassis, and a top chassis configured to support the display panel and to be detachably coupled with the side frame or attachable and detachable from the side frame, and the top chassis may include a top chassis coupling portion disposed to be coupled with the side frame and the light source supporting unit.

The side frame may be integrally formed with the bottom chassis.

One surface of the light source supporting unit may support the display panel, and the other surface of the light source may support the light guide plate.

The light source may be disposed on the other surface of the light source supporting unit.

The side frame may be disposed between the top chassis and the bottom chassis and including a frame seating portion configured to support the light source supporting unit, and the top chassis coupling portion may be coupled with the light source supporting unit and the frame seating portion.

The top chassis coupling portion, the light source supporting unit, and the frame seating portion may be coupled in a front-to-back direction without causing interference on the bottom chassis.

The top chassis coupling portion, the light source supporting unit, and the side frame may be sequentially coupled.

The top chassis coupling portion, the light source supporting unit, and the side frame may be fixed by screw-coupling.

The top chassis coupling portion may include an insertion space, into which a screw for coupling the top chassis coupling portion, the light source supporting unit, and the frame seating portion is inserted, recessed toward the bottom chassis relative to the panel supporting portion, and the display apparatus may further include a cover, at least one portion of which covers the insertion space, disposed on the front surface of the top chassis.

The cover may be formed of a magnetic material, and the display apparatus may further include a magnet inserted into the insertion space to allow the cover to be attached to the front surface of the top chassis.

According to an aspect of an exemplary embodiment, a display apparatus is provided. The display apparatus includes a light source configured to generate light, a light guide plate configured to transmit the light generated by the light source through a light transmitting surface, a display panel disposed to correspond to the light transmitting surface, a bottom chassis disposed at a rear portion of the light guide plate, a side frame disposed along a side of the bottom chassis and fixed to the bottom chassis, and a top chassis coupled to the side frame, and the top chassis may include a panel supporting portion configured to support at least one portion of the front surface of the display panel, a light guide plate supporting portion extending from the panel supporting portion to support the light guide plate, and a top chassis coupling portion disposed to allow the top chassis to be coupled with the side frame.

The panel supporting portion, the light guide plate supporting portion, and the top chassis coupling portion may be integrally formed.

The top chassis coupling portion may be coupled with the side frame in a front-to-back direction without causing interference on the bottom chassis.

The bottom chassis may be integrally formed with the side frame.

The light source may be disposed to face the light guide plate and supported by the side frame.

The light source may include a light emitting diode (LED).

The top chassis coupling portion may include an insertion space, into which a screw for coupling the top chassis coupling portion, the light source supporting unit, and a frame seating portion is inserted, recessed toward the bottom chassis relative to the panel supporting portion, and the display apparatus may further include a cover, at least one portion of which covers the insertion space, disposed on the front surface of the top chassis.

The cover may include a front cover configured to cover the front surface of the top chassis, and a fixing cover extending from the front cover in a bent form and fixed to the top chassis.

The fixing cover may include an extension portion inserted into an insertion hole formed between the top chassis and the side frame, and a head portion extending from the extension portion and inserted into a holding portion disposed at an end of the insertion hole and having a greater width than the insertion hole.

The head portion may include an outer head portion extending from the extension portion and an inner head portion extending from the outer head portion and spaced apart from the outer head portion at a predetermined distance at least in part, and the outer head portion and the inner head portion may be pressed by the insertion hole to be closer to each other and elastically return after the head portion passes through the insertion hole.

According to an aspect of an exemplary embodiment, a display apparatus is provided. The display apparatus includes a light source configured to generate light, a light guide plate configured to transmit the light generated by the light source through a light transmitting surface, a display panel disposed to correspond to the light transmitting surface, a bottom chassis disposed at a rear portion of the light guide plate, and a top chassis coupled with the bottom chassis, and the top chassis may include a panel supporting portion configured to support at least one portion of the front surface of the display panel, a light guide plate supporting portion extending from the panel supporting portion to support the light guide plate, and a top chassis coupling portion disposed to face the bottom chassis to allow the top chassis to be coupled with the bottom chassis.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIGS. 25A and 25B are diagrams for describing manufacturing of the bottom chassis;

DETAILED DESCRIPTION

Figure 1:
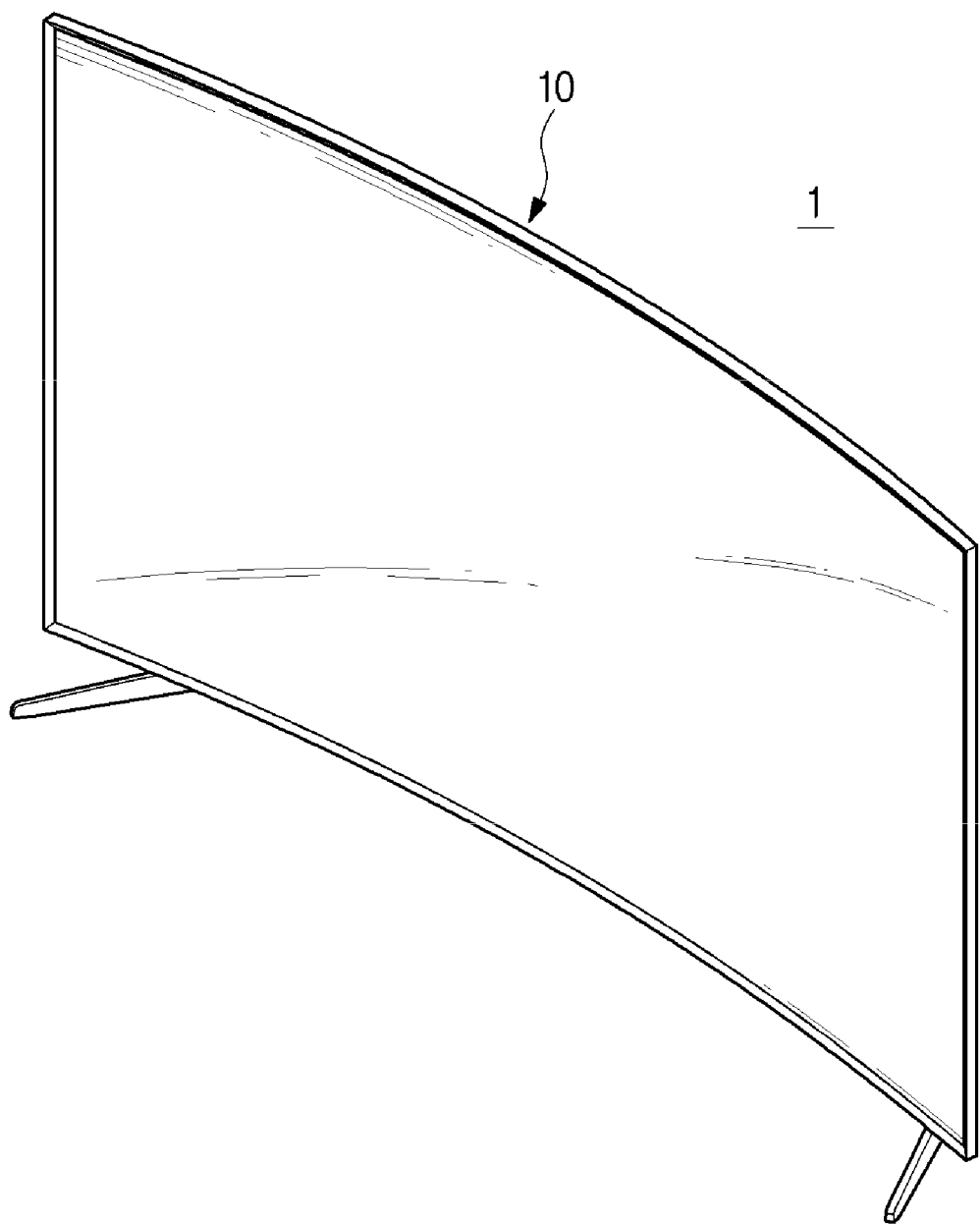
FIG. 1 is a perspective view illustrating a display apparatus according to an exemplary embodiment.

Reference will now be made in detail to the exemplary embodiments, which are illustrated in the accompanying drawings. In the drawings, like reference numerals refer to like elements throughout.

The terms used in the present specification are merely used to describe particular exemplary embodiments, and are not intended to limit the present disclosure. An expression used in the singular encompasses the expression of the plural, unless it has a clearly different meaning in the context. In the present specification, it is to be understood that the terms such as "including" or "having," etc., are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present.

It will be understood that, although the terms "first", "second", etc., may be used herein to describe various elements, these elements should not be limited by these terms. The above terms are used only to distinguish one component from another. For example, a first component discussed below could be termed a second component, and similarly, the second component may be termed the first component without departing from the teachings of this disclosure. As used herein, the term "and/or" includes any and all combinations of one or more of the associated listed items.

Hereinafter, exemplary embodiments will be described in detail with reference to the accompanying drawings.

Figure 2:
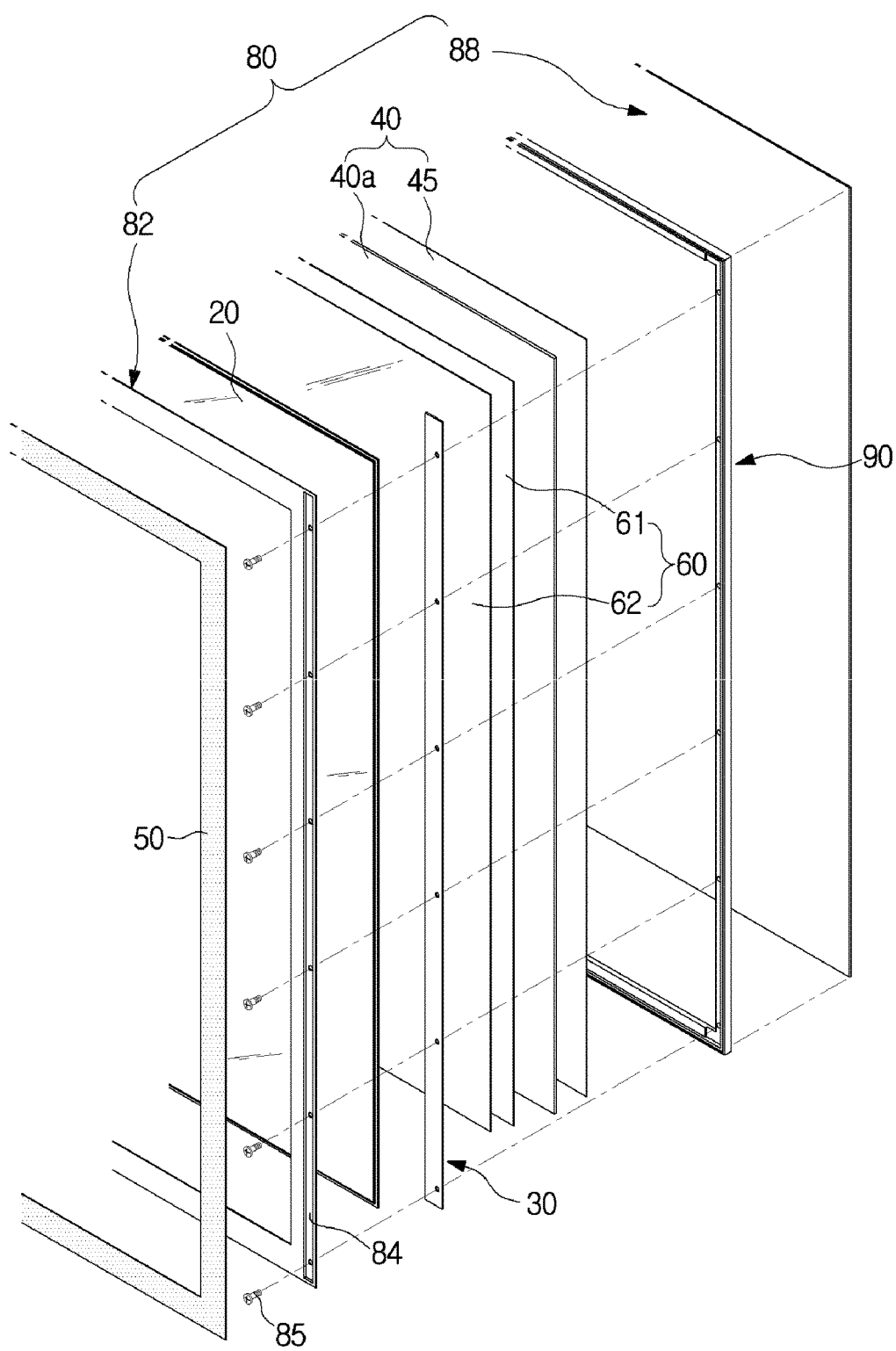
FIGS. 2 and 3 are exploded perspective views illustrating the display apparatus.
Figure 3:
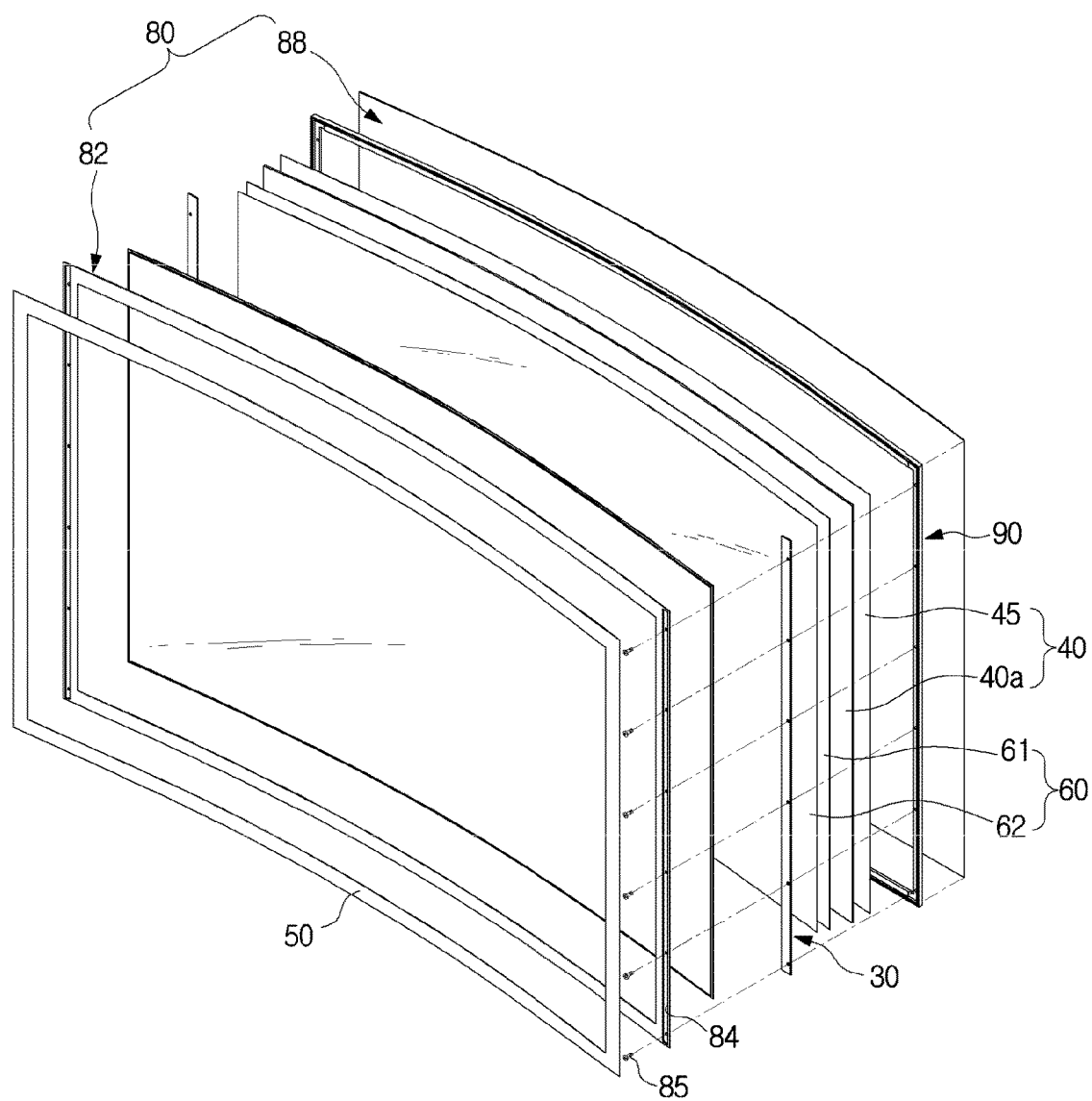

FIG. 1 is a perspective view illustrating a display apparatus according to an exemplary embodiment. FIGS. 2 and 3 are exploded perspective views illustrating the display apparatus.

As illustrated in FIG. 1, a display apparatus 1 according to an exemplary embodiment is curved such that opposite sides of the display apparatus 1 protrude farther forward than the middle of the display apparatus 1. A curved display apparatus may be manufactured using a display panel 20 with a curvature or using a flat display panel and a chassis 80, which has a curvature and supports the flat display panel 20 to curve the flat display panel 20. When an image is displayed thereon, an immersive feeling of a user may be improved.

Although the curved display apparatus will be described as the display apparatus 1 according to the present exemplary embodiment, a flat display apparatus or a bendable or flexible display apparatus that is convertible between a curved state and a flat state may also be applied thereto.

The display apparatus 1 may also be applied to various display apparatuses regardless of the size of a screen. For example, the display apparatus 1 may be applied to products mounted on a table, wall, or ceiling such as smart TVs and monitors or portable products such as tablet PCs, laptop computers, smart phones, and eBooks.

The display apparatus 1 includes a display module 10 to display an image, at least one circuit board electrically connected to the display module 10, and a housing 12 to support the display module 10.

The at least one circuit board may include a power supply board on which a circuit device to supply power to the display module 10 is disposed, a signal processing board on which a circuit device to be connected with an external device or to receive and process an external signal, and a driving circuit board to drive the display module 10, and these circuit boards may be independently arranged or may be incorporated into one circuit board.

The display module 10 may include a display panel 20 on which an image is displayed, a backlight unit, a chassis 80. The backlight unit may include a light source unit 30, a light guide plate 40, and an optical member.

That is, the display module 10 may include the light source unit 30 disposed at the rear of the display panel 20 and the light guide plate 40 to guide light generated by the light source unit 30 toward the display panel 20, as an edge-type backlight unit. The light guide plate (LGP) 40 may convert light emitted from the light source unit 30 into the same form as light of a surface light source 32 and guide the converted light toward the display panel 20.

The backlight unit may further include an optical member. The optical member may include an optical sheet 60 having optical properties.

The chassis 80 may include a top chassis 82 and a bottom chassis 88 disposed at the rear of the top chassis 82. The chassis 80 may be disposed to support the display panel 20.

Since the display apparatus 1 is curved, the display module 10 installed in the curved display apparatus 1 is formed to have a curvature in a lateral direction. Thus, each of the display panel 20, the light guide plate 40, the top chassis 82, and the bottom chassis 88 constituting the display module 10 is formed to have a curvature in the lateral direction, so that opposite sides of each component protrude farther forward than the middle thereof. In this regard, the respective components may have the same curvature or different curvatures according to the intended design.

For example, at least one of the display panel 20, the light guide plate 40, and the optical sheet 60 may be formed in a flat shape or may be formed to have a curvature by the chassis 80. The light source unit 30 may be disposed at one or more portions of a side of the light guide plate 40 and emit light. The light source unit 30 may be disposed along a shorter side or a longer side. However, the position of the light source unit 30 is not limited thereto as long as the light source unit 30 is disposed at one or more portions of a side of the light guide plate 40 and emits light toward the light guide plate 40. The light source unit 30 may also be disposed at one or both vertical sides of the chassis 80. For example, the light source unit 30 may be disposed at one side of the display module 10 as illustrated in FIG. 2 or a pair of the light source units 30 may be disposed at both sides of the display module 10 as illustrated in FIG. 3.

Figure 4:
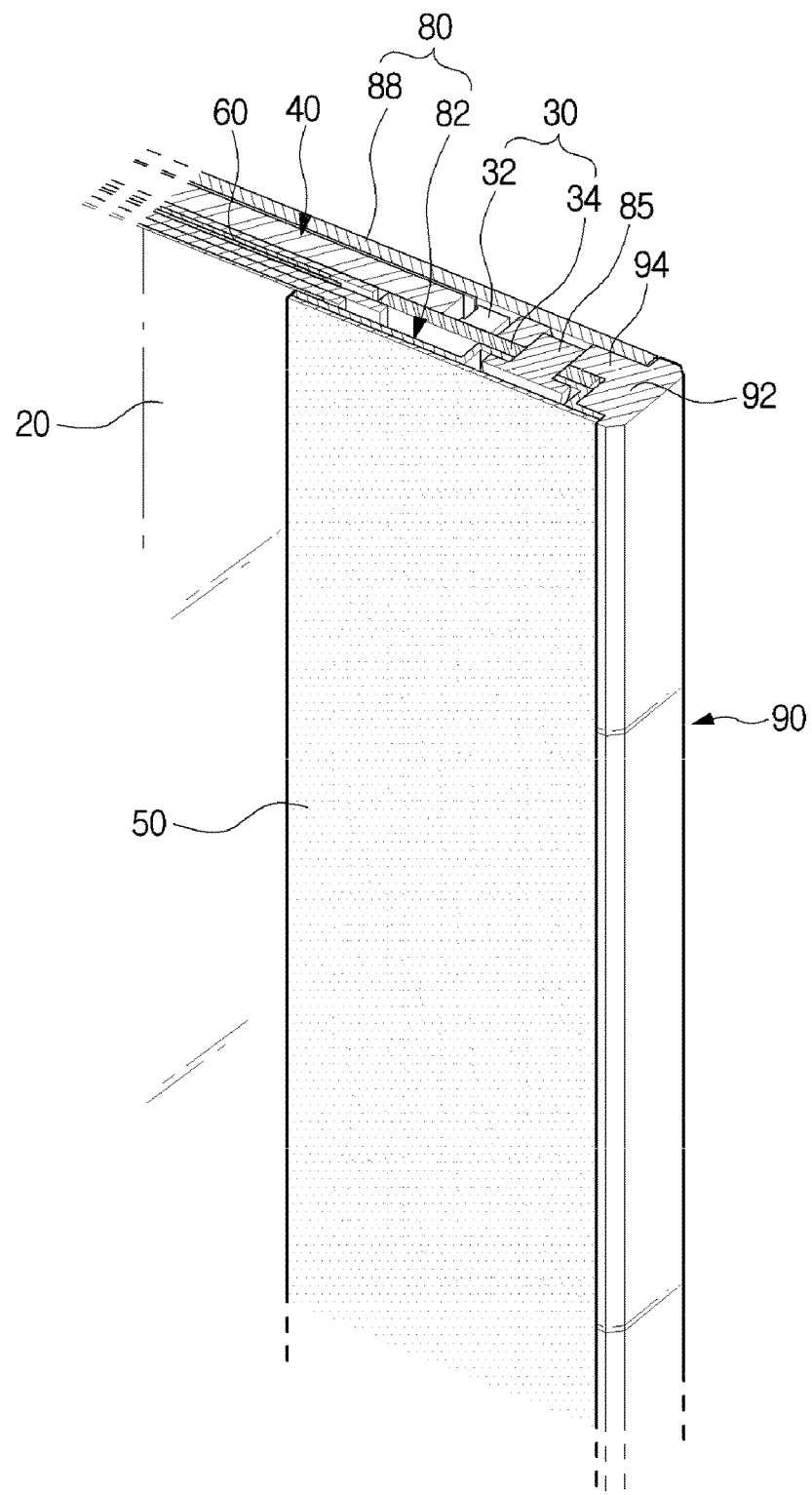
FIG. 4 is a cross-sectional perspective view illustrating the display apparatus.
Figure 5:
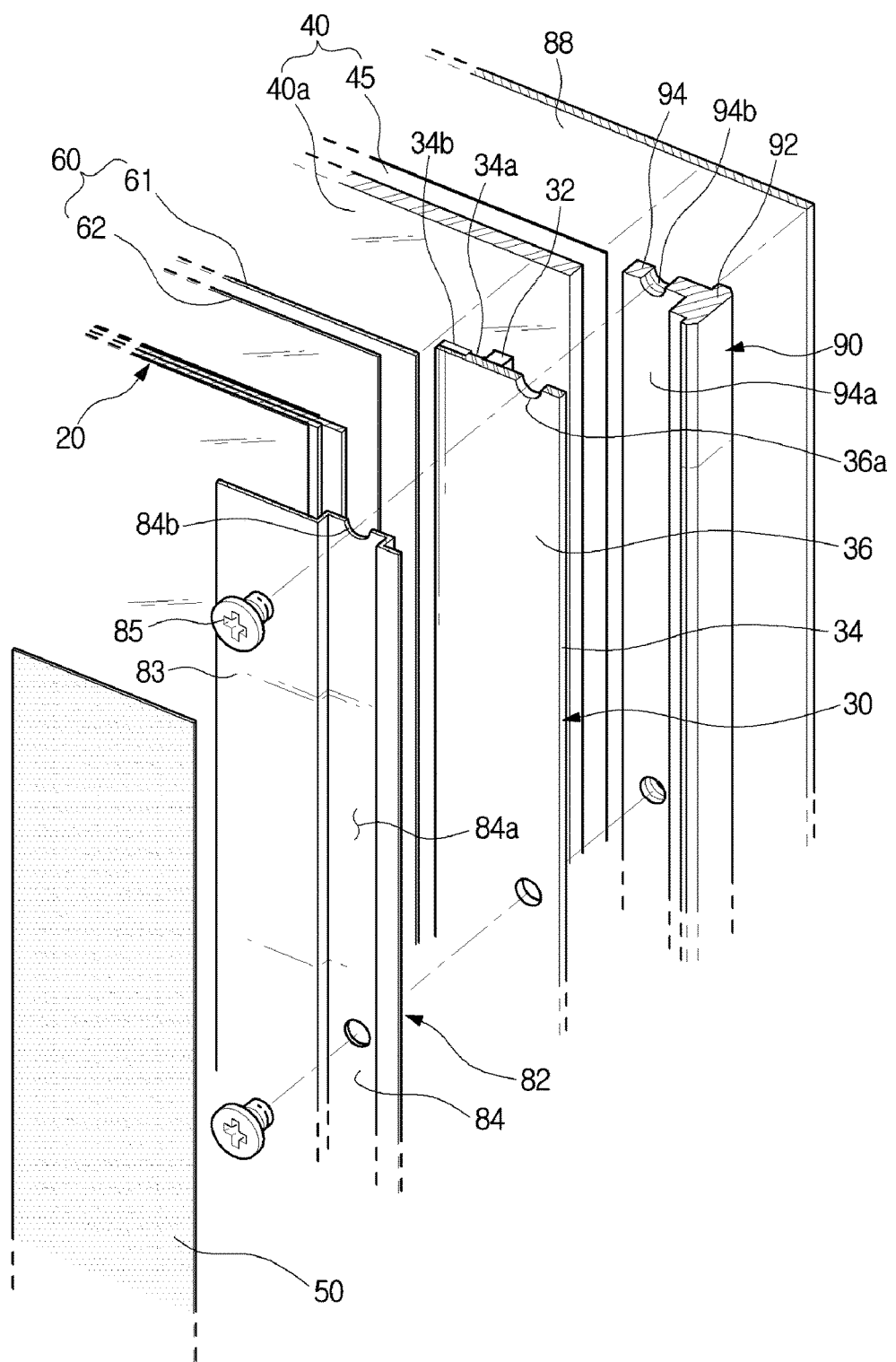
FIG. 5 is an exploded perspective view of FIG. 4.
Figure 6:
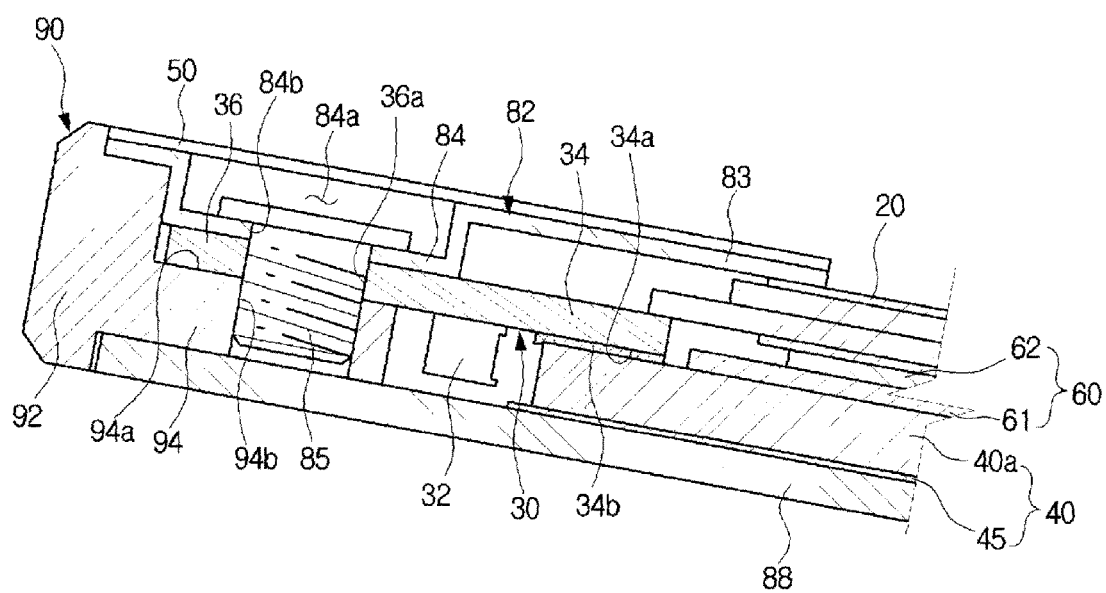
FIG. 6 is a cross-sectional view illustrating the display apparatus.

FIG. 4 is a cross-sectional perspective view illustrating the display apparatus. FIG. 5 is an exploded perspective view of FIG. 4. FIG. 6 is a cross-sectional view illustrating the display apparatus.

The light source unit 30 includes a light source 32 and a light source supporting unit 34. A plurality of light sources 32 may be arranged at predetermined intervals to constitute one module. Each module may be disposed at an edge portion of the light guide plate 40. The light source 32 may include a light emitting diode (LED). The light source supporting unit 34 will be described later in more detail.

The light guide plate 40 may include a reflection unit 45 disposed on the rear surface thereof. Particularly, the light guide plate 40 may include a light guide unit 40a and the reflection unit 45. The reflection unit 45 may be disposed on the rear surface of the light guide plate 40 such that light generated by the light source unit 30 is transmitted forward. More particularly, the reflection unit 45 may be disposed to reflect light generated by the light source unit 30 toward the display panel 20.

The reflection unit 45 may be formed as a reflecting plate or a reflecting sheet. Alternatively, the reflection unit 45 may be separately prepared from the light guide plate 40 and disposed on the rear surface of the light guide plate 40 or may be integrated with the light guide plate 40. The rear surface of the light guide plate 40 may also be reflectively coated to obtain the same effects.

The light guide plate 40 may transmit light generated by the light source unit 30. To this end, the light guide plate 40 may be formed of a transparent resin material. The light guide plate 40 may be spaced a predetermined distance from the light source unit 30 to prevent deformation thereof caused by heat generated by the light source unit 30.

The display apparatus 1 may include the optical member.

The optical member may include an optical sheet 60 having optical properties.

The optical sheet 60 may include a diffuser sheet 61 to diffuse incident light and a dual brightness enhancement film (BDEF) sheet 62, which is a high brightness prism sheet. The optical sheet 60 may include a polarization sheet and a prism sheet.

The optical sheet 60 may be disposed between the light guide plate 40 and the display panel 20 to change optical properties of light output from the light guide plate 40.

The light source supporting unit 34 may transmit an electric signal to the light sources 32 to turn on/off the light sources 32. The light source supporting unit 34 may include a printed circuit board (PCB) on which the light sources 32 are mounted. According to an exemplary embodiment, the light sources 32 operate in a state of being linearly arranged on the light source supporting unit 34.

The light source supporting unit 34 is formed to support at least one portion of the light guide plate 40. Particularly, one surface of the light source supporting unit 34 may support the display panel 20, and the opposite surface of the light source supporting unit 34 may support the light guide plate 40. The light sources 32 may be disposed on the opposite surface of the light source supporting unit 34.

Since the light source supporting unit 34 supports the light guide plate 40, the light source supporting unit 34 may be disposed along one edge of the light guide plate 40. The plurality of light sources 32 may also be arranged along the lengthwise direction of the light source supporting unit 34 at predetermined intervals.

The light source supporting unit 34 may have a light guide plate supporting surface 34a. The light guide plate supporting surface 34a of the light source supporting unit 34 is formed to face and support the light guide plate 40.

The light source supporting unit 34 may further include a supplementary member 34b disposed on the light guide plate supporting surface 34a and preventing light emitted from the light source 32 from being streamed through a gap between the light guide plate supporting surface 34a and the light guide plate 40. The supplementary member 34b may also be a heat insulation film to prevent heat generated by the light guide plate 40 from being transferred to the light source supporting unit 34.

The light source supporting unit 34 may be seated on a frame seating portion 94 of a side frame 90, which will be described later. A top chassis coupling portion 84 may be disposed at one surface of the light source supporting unit 34, and the frame seating portion 94 may be disposed at the opposite surface of the light source supporting unit 34 for coupling thereof. The light source supporting unit 34 may have a light source coupling portion 36 to be coupled with the top chassis coupling portion 84 and the frame seating portion 94. The light source coupling portion 36 may have a light source coupling hole 36a for screw-coupling.

The light source supporting unit 34 may have at least one light source coupling hole 36a or a plurality of light source coupling holes 36a spaced at predetermined intervals along the light source supporting unit 34.

As described above, the chassis 80 may include the top chassis 82 and the bottom chassis 88.

The bottom chassis 88 may be disposed at the rear of the light guide plate 40 to support the light guide plate 40. The bottom chassis 88 may form the rear surface of the display module 10. The bottom chassis 88 may be curved such that opposite sides thereof protrude farther forward than the middle of the bottom chassis 88. Since the bottom chassis 88 supports the light guide plate 40 at the rear of the light guide plate 40, the light guide plate 40 may also be curved by the bottom chassis 88.

Thus, light generated by the light source 32 may be reflected by the reflection unit 45 of the curved light guide plate 40, pass through the light guide unit 40a, and be guided to the display panel 20.

The top chassis 82 may form a portion of the front surface of the display module 10. The top chassis 82 may support at least one portion of the display panel 20. The top chassis 82 is formed along edges of the display panel 20 to form a bezel of the display module 10.

The top chassis 82 may include a panel supporting portion 83 and a top chassis coupling portion 84.

The panel supporting portion 83 supports at least one portion of the display panel 20. Particularly, the panel supporting portion 83 may support an edge portion of the display panel 20.

The top chassis coupling portion 84 may extend from the panel supporting portion 83 to be coupled with the side frame 90, which will be described later. The top chassis coupling portion 84 may be recessed backward relative to the panel supporting portion 83.

The top chassis coupling portion 84 may include an insertion space 84a, into which a screw 85 is inserted, recessed toward the bottom chassis 88 relative to the panel supporting portion 83. The screw 85 is inserted into the insertion space 84a to couple the top chassis coupling portion 84, the light source supporting unit 34, and the frame seating portion 94, which will be described later. The top chassis coupling portion 84 may have a top coupling hole 84b for coupling with the screw 85.

The top chassis coupling portion 84 may have at least one top coupling hole 84b or a plurality of top coupling holes 84b arranged at predetermined intervals along the top chassis coupling portion 84.

The chassis 80 may further include the side frame 90.

At least one portion of the side frame 90 may be disposed between the top chassis 82 and the bottom chassis 88. The side frame 90 may be disposed along an edge of the display module 10 to form one side of the display module 10.

The side frame 90 may be separably coupled to the bottom chassis 88. However, the shape of the side frame 90 is not limited thereto, and the side frame 90 may also be integrally formed with the bottom chassis 88. The side frame 90 may be fixed to the bottom chassis 88.

The side frame 90 may include a frame body 92 and the frame seating portion 94.

The frame body 92 may be formed along one side of the display module 10. The frame seating portion 94 may extend from the frame body 92 such that the light source supporting unit 34 is seated thereon. The frame seating portion 94 is disposed between the top chassis 82 and the bottom chassis 88 in a shape corresponding to one end of the light source supporting unit 34 such that the end of the light source supporting unit 34 is seated thereon. Particularly, the frame seating portion 94 may have a frame seating surface 94a to support one surface of the light source supporting unit 34.

The frame seating portion 94 of the side frame 90 and the top chassis coupling portion 84 of the top chassis 82 may be aligned in a front-to-back direction. Accordingly, the top chassis coupling portion 84 and the frame seating portion 94 may be coupled with each other by using the screw 85 inserted from the front surface of the display apparatus 1.

The frame seating portion 94 may have a frame coupling hole 94*b* for coupling using the screw 85. Since the frame seating portion 94 has the frame coupling hole 94*b*, the frame coupling hole 94*b*, the top coupling hole 84*b*, and the light source coupling hole 36*a* may be coupled by the screw 85.

One side of the frame coupling hole 94*b* may be located to correspond to the top coupling hole 84*b*, and the opposite side thereof may be spaced apart from the bottom chassis 88. Through this configuration, no interference is caused on the bottom chassis 88 even when the top chassis 82 is coupled with the side frame 90 by using the screw 85. In other words, the top chassis 82 may not directly touch or directly be coupled to the bottom chassis. For example, the bottom chassis 88 may not have holes or protruding portions to receive screws or to couple with portions of the top chassis 82. However, the configuration is not limited thereto, no interference may be caused on the bottom chassis 88 by adjusting a length of the screw 85. An aesthetically appealing appearance of the bottom chassis 88 may be obtained by coupling the top chassis 82 with the side frame 90 without causing interference on the bottom chassis 88. In addition, since the bottom chassis 88 does not need to have another coupling hole for assembling of the display apparatus 1, damage to the inside of the display apparatus 1 caused by the external environment through the bottom chassis 88 may be prevented.

Although coupling of the top chassis 82 with the side frame 90 by using the screw 85 is described above by way of example, the top chassis 82 and the side frame 90 may be coupled with each other by using various other methods.

The frame seating portion 94 may have at least one frame coupling hole 94*b* or a plurality of frame coupling holes 94*b* arranged at predetermined intervals along the frame seating portion 94.

Although the light source supporting unit 34 is seated on the side frame 90 according to the present exemplary embodiment, the structure is not limited thereto. One end of the light source supporting unit 34 may be inserted into the side frame 90 and supported thereby, or the light source supporting unit 34 may be coupled with the side frame 90. The shape and arrangement of the light source supporting unit 34 fixed to or supported by a neighboring element are not limited. Particularly, the light source supporting unit 34 may be coupled with and supported by at least one of the side frame 90, the top chassis 82, and the bottom chassis 88, thereby supporting at least one portion of the light guide plate 40.

The chassis 80 may include a cover 50, at least one portion of which covers the front surface of the top chassis 82. The cover 50 may cover the insertion space 84*a* of the top chassis coupling portion 84 to obtain an aesthetically appealing appearance.

The cover 50 may be formed of at least one material selected from the group consisting of a film, metal, and plastic. The material used to form the cover 50 is not limited thereto, and the cover 50 covers at least one portion of the front surface of the top chassis 82 to prevent the top chassis coupling portion 84 from being exposed to the outside.

The cover 50 may be permanently attached to the top chassis 82 or detachably coupled or attachable and detachable from the top chassis 82. Methods of covering the front surface of the top chassis 82 by using the cover 50 are not limited thereto.

For example, although the cover 50 covers the front surface of the top chassis 82, the cover 50 may also extend to the side frame 90 and the bottom chassis 88.

Hereinafter, a process of assembling the display apparatus 1 will be described.

The side frame 90 is coupled to the bottom chassis 88. In this case, the bottom chassis 88 may be integrally formed with the side frame 90 as described above.

The assembling may be performed such that the light guide plate 40, the optical sheet 60, and the display panel 20 are sequentially disposed on the front surface of the bottom chassis 88.

The light source unit 30 may be seated on the side frame 90 to support the light guide plate 40. Particularly, the light source 32 may be disposed at one side of the light guide plate 40, and the light source unit 30 may be disposed such that the light source supporting unit 34 is seated on the frame seating surface 94*a* of the frame seating portion 94.

The supplementary member 34*b* may be disposed on the light guide plate supporting surface 34*a* of the light source supporting unit 34 facing the light guide plate 40 to be in contact with the light guide plate 40.

The top chassis 82 may be disposed at the front of the display panel 20 and the light source supporting unit 34 such that the panel supporting portion 83 of the top chassis 82 supports the display panel 20 and the top chassis coupling portion 84 of the top chassis 82 is seated on one surface of the light source supporting unit 34. As a result, these elements may be arranged in the order of the top chassis coupling portion 84, the light source supporting unit 34, and the side frame 90.

As the screw 85 is inserted into the insertion space 84*a* of the top chassis coupling portion 84, the top chassis coupling portion 84, the light source supporting unit 34, and the frame seating portion 94 may be fixed by coupling using the screw 85.

Particularly, the screw 85 is inserted into the insertion space 84*a* of the top chassis coupling portion 84 exposed toward the display apparatus 1. The screw 85 is inserted into the top coupling hole 84*b*, the light source coupling hole 36*a*, the frame coupling hole 94*b* to couple the top chassis 82, the light source supporting unit 34, and the side frame 90.

The top chassis coupling portion 84 may not be exposed to the outside by disposing the cover 50 on the front surface of the top chassis 82.

Since the display apparatus 1 is assembled at a front side thereof as described above, productivity of the display apparatus 1 may be improved.

Hereinafter, another exemplary embodiment will be described.

In this regard, description presented above will not be repeated.

Figure 7:
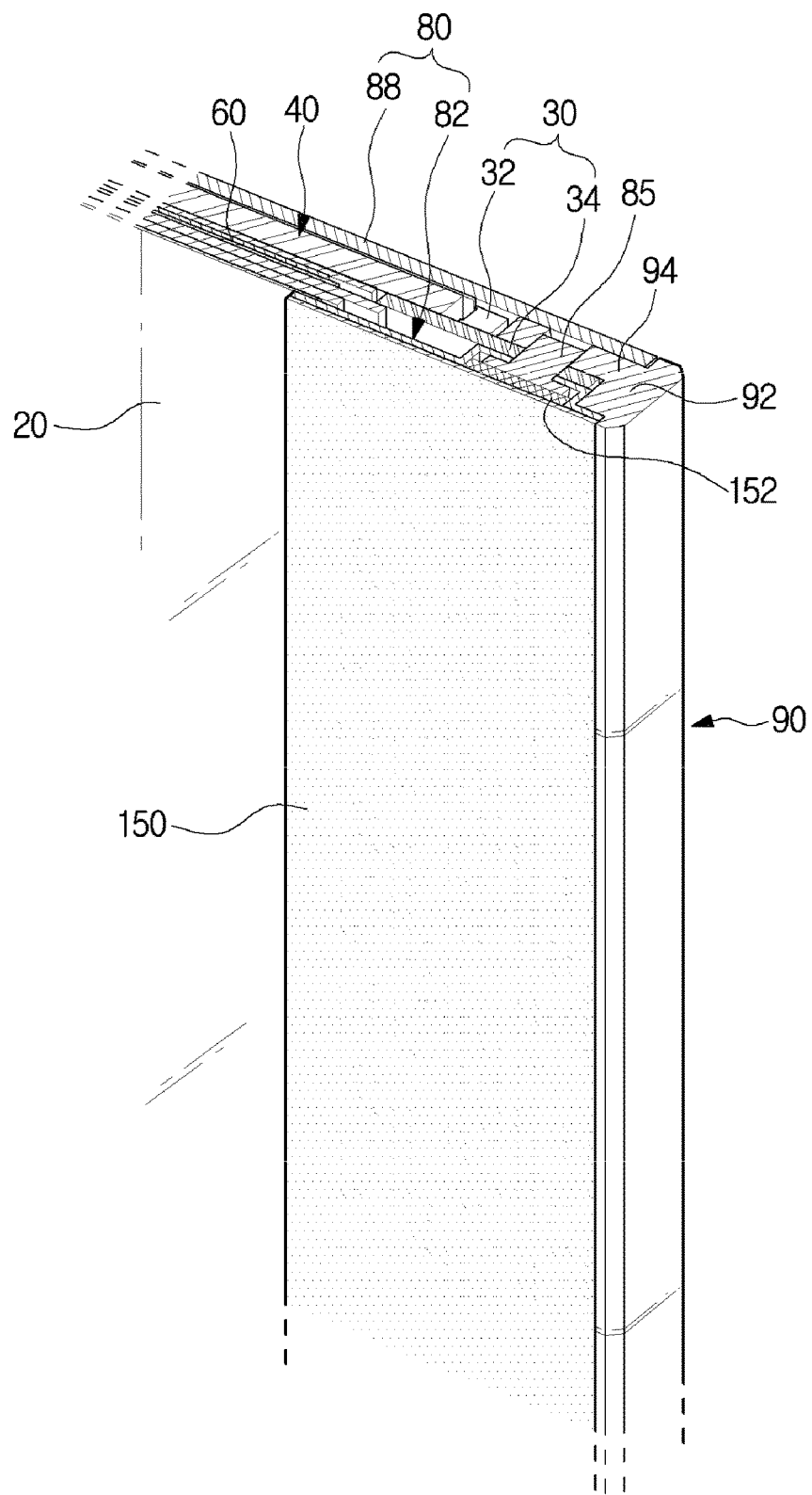
FIG. 7 is a cross-sectional perspective view illustrating a display apparatus according to another exemplary embodiment.
Figure 8:
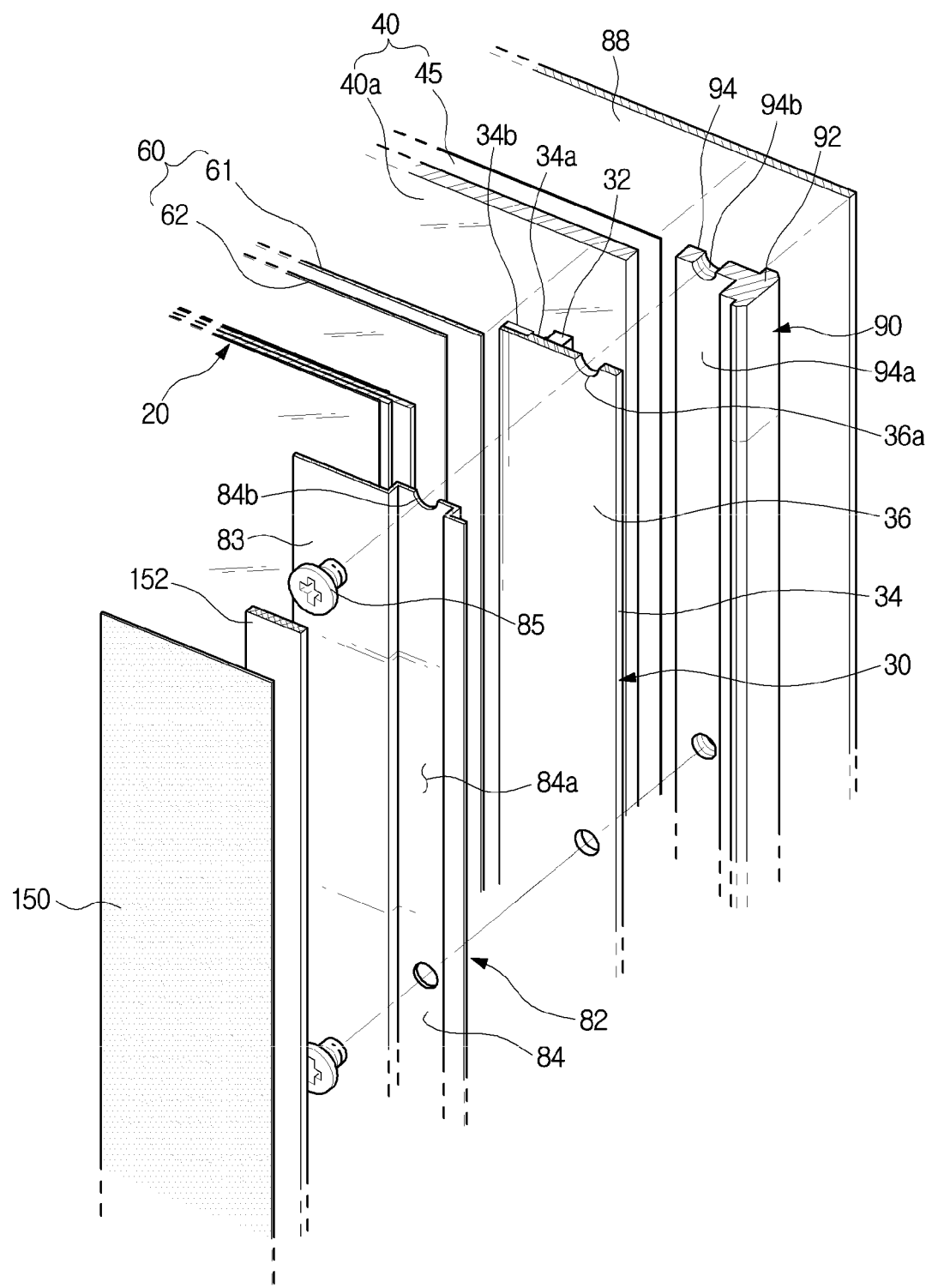
FIG. 8 is an exploded perspective view of FIG. 7.
Figure 9:
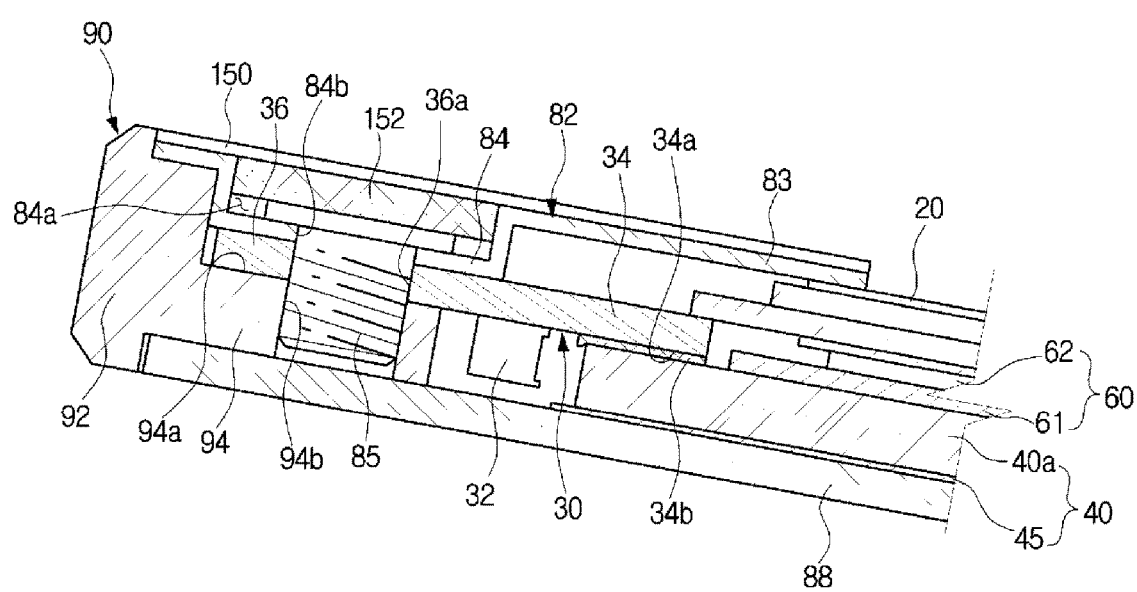
FIG. 9 is a cross-sectional view of the display apparatus.

FIG. 7 is a cross-sectional perspective view illustrating a display apparatus according to another exemplary embodiment. FIG. 8 is an exploded perspective view of FIG. 7. FIG. 9 is a cross-sectional view of the display apparatus.

The chassis 80 may include a cover 150, at least one portion of which covers the front surface of the top chassis 82. The cover 150 may cover the insertion space 84*a* of the top chassis coupling portion 84 to obtain an aesthetically appealing appearance.

The cover 150 may be formed of a magnetic material. A magnet 152 may be disposed in the insertion space 84*a* of the top chassis coupling portion 84 such that the cover 150 is attached to the top chassis 82 by the magnet 152.

Through this configuration, the cover 150 may be efficiently separated from the top chassis 82.

Hereinafter, another exemplary embodiment will be described.

In this regard, description presented above will not be repeated.

Figure 10:
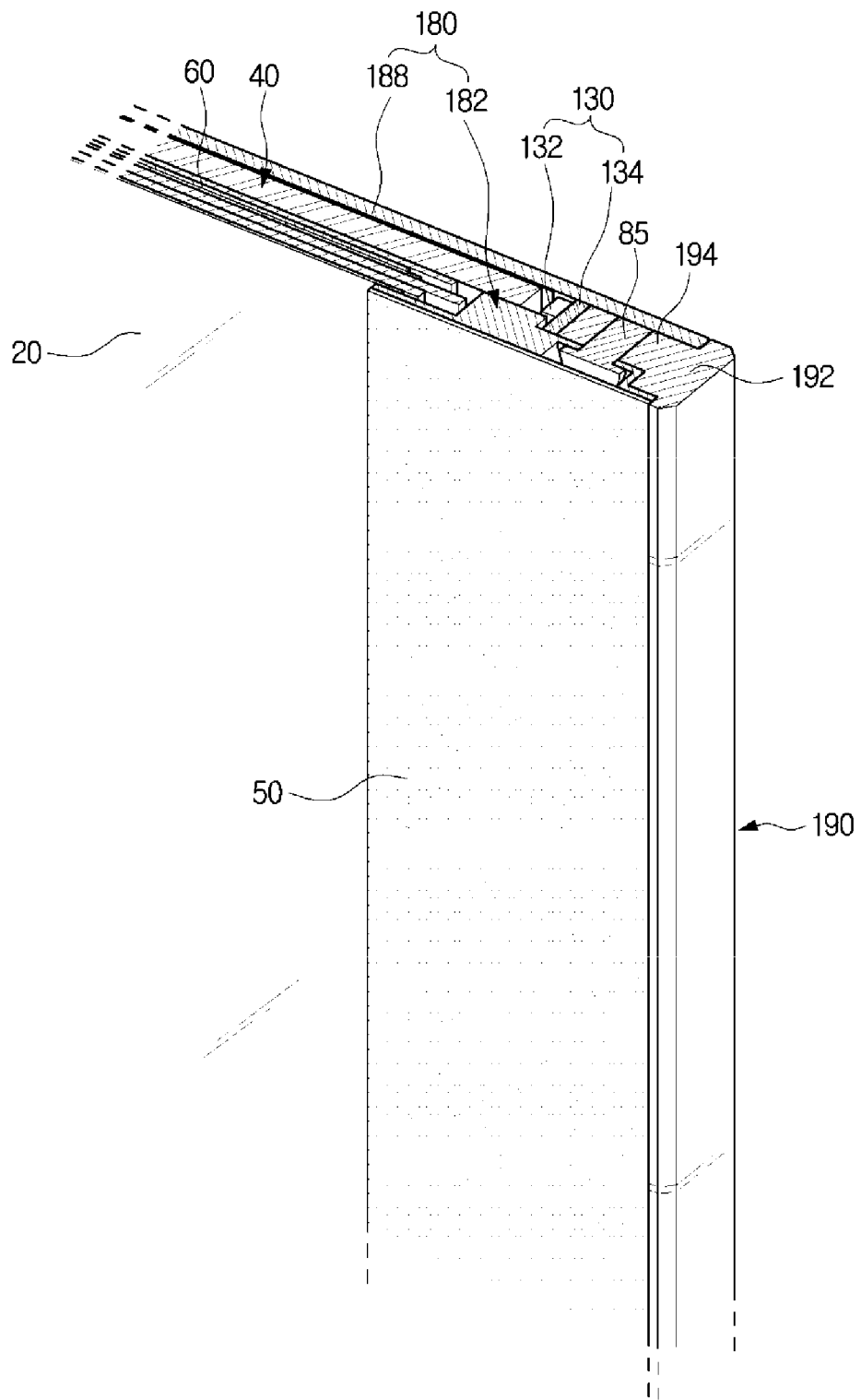
FIG. 10 is a cross-sectional perspective view illustrating a display apparatus according to another exemplary embodiment.
Figure 11:
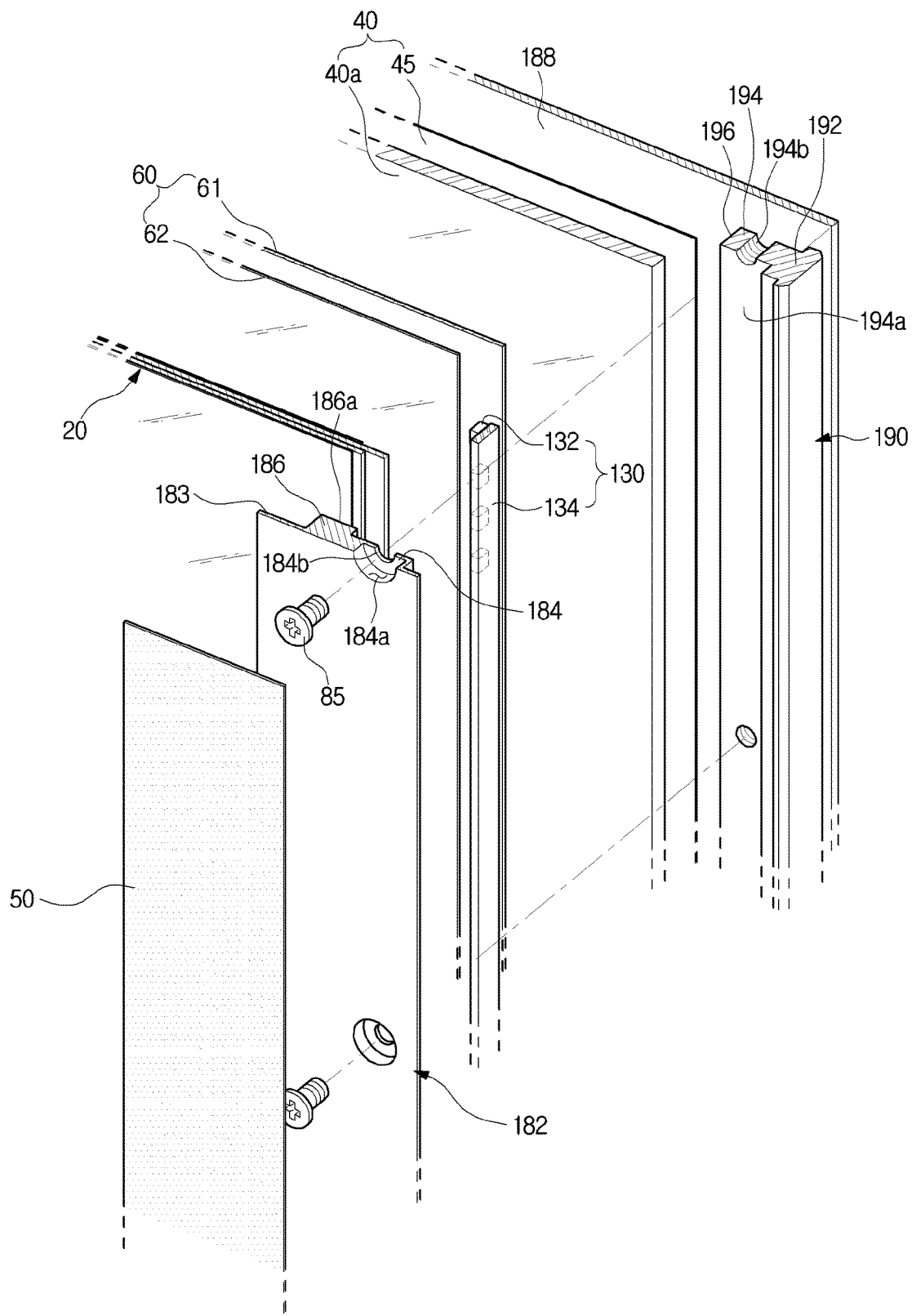
FIG. 11 is an exploded perspective view of FIG. 10.
Figure 12:
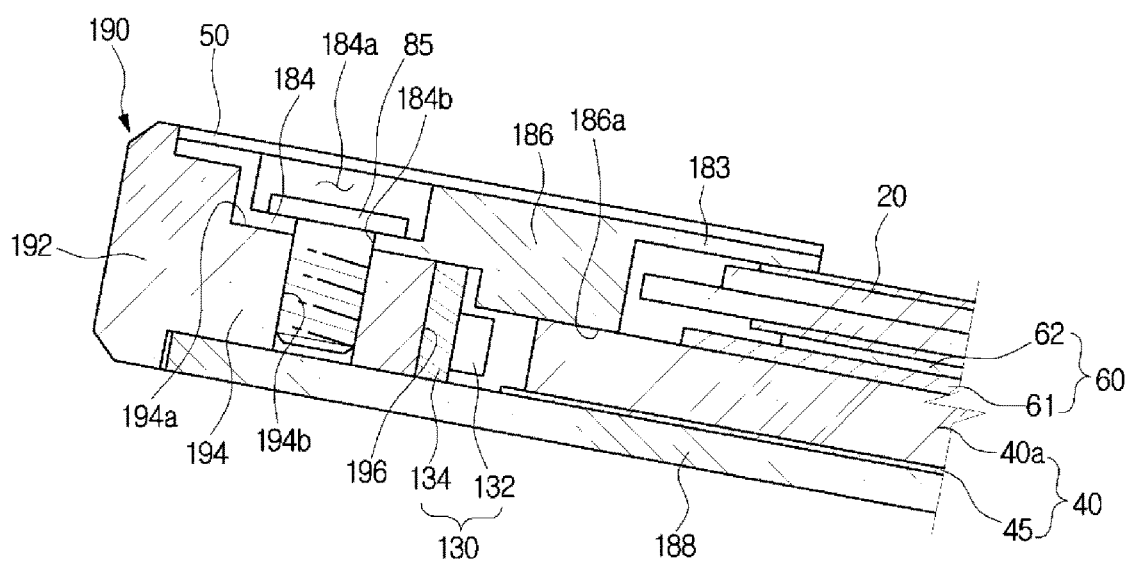
FIG. 12 is a cross-sectional view illustrating the display apparatus.

FIG. 10 is a cross-sectional perspective view illustrating a display apparatus according to another exemplary embodiment. FIG. 11 is an exploded perspective view of FIG. 10. FIG. 12 is a cross-sectional view illustrating the display apparatus.

A chassis 180 may include a top chassis 182 and a bottom chassis 188.

The top chassis 182 may form a portion of the front surface of the display module 10. The top chassis 182 may support at least one portion of the display panel 20. The top chassis 182 is formed along edges of the display panel 20 to form a bezel of the display module 10.

The top chassis 182 may have a panel supporting portion 183, a light guide plate supporting portion 186, and a top chassis coupling portion 184.

The panel supporting portion 183 supports at least one portion of the display panel 20. Particularly, the panel supporting portion 183 supports an edge portion of the display panel 20.

The top chassis coupling portion 184 may extend from the panel supporting portion 183 to be coupled with a side frame 190, which will be described later. The top chassis coupling portion 184 may be recessed backward relative to the panel supporting portion 183.

The top chassis coupling portion 184 may include an insertion space 184a, into which a screw 185 is inserted, recessed toward the bottom chassis 188 relative to the panel supporting portion 183. The screw 185 is inserted into the insertion space 184a to couple the top chassis coupling porting 184, a light source supporting unit 134, and a frame seating portion 194, which will be described later. The top chassis coupling portion 184 may have a top coupling hole 184b for coupling with the screw 185.

The top chassis coupling portion 184 may have at least one top coupling hole 84b or a plurality of top coupling holes 184b arranged at predetermined intervals along the top chassis coupling portion 184.

The light guide plate supporting portion 186 may support at least one portion of the light guide plate 40. Particularly, the light guide plate supporting portion 186 may support an edge portion of the light guide plate 40. The light guide plate supporting portion 186 may have a light guide plate supporting surface 186a. The light guide plate supporting surface 186a of the light guide plate supporting portion 186 is formed to face the light guide plate 40 and disposed to support the light guide plate 40.

The light guide plate supporting portion 186 may further include a supplementary member 186b disposed on the light guide plate supporting surface 186a and preventing light emitted from a light source 132 from being streamed through a gap between the light guide plate supporting surface 186a and the light guide plate 40. The supplementary member 186b may also be a heat insulation film to prevent heat generated by the light guide plate 40 from being transferred to the light guide plate supporting portion 186.

The chassis 180 may further include a side frame 190.

At least one portion of the side frame 190 may be disposed between the top chassis 182 and the bottom chassis 188. The side frame 190 may be disposed along an edge of the display module 10 to form one side of the display module 10.

The side frame 190 may be separably coupled to the bottom chassis 188.

However, the shape of the side frame 190 is not limited thereto, and the side frame 190 may also be integrally formed with the bottom chassis 188. The side frame 190 may be fixed to the bottom chassis 188.

The side frame 190 may include a frame body 192 and a frame seating portion 194.

The frame body 192 may be formed along one side of the display module 10.

The frame seating portion 194 may extend from the frame body 192 such that the light source supporting unit 134 is seated thereon. The frame seating portion 194 is disposed between the top chassis 182 and the bottom chassis 188 to face the top chassis coupling portion 184. Particularly, the frame seating portion 194 may have a frame seating surface 194a facing the top chassis coupling portion 184.

The frame seating portion 194 of the side frame 190 and the top chassis coupling portion 184 of the top chassis 182 may be aligned in a front-to-back direction. Accordingly, the top chassis coupling portion 184 and the frame seating portion 194 may be coupled with each other by using the screw 185 inserted from the front surface of the display apparatus 1.

The frame seating portion 194 may have a frame coupling hole 194b for coupling using the screw 185. Since the frame seating portion 194 has the frame coupling hole 194b, the frame coupling hole 194b may be used for coupling using the screw 185 together with the top coupling hole 184b.

One side of the frame coupling hole 194b may be located to correspond to the top coupling hole 184b, and the opposite side thereof may be spaced apart from the bottom chassis 188. Through this configuration, no interference is caused on the bottom chassis 188 even when the top chassis 182 is coupled with the side frame 190 by using the screw 185. However, the configuration is not limited thereto, no interference may be caused on the bottom chassis 188 by adjusting a length of the screw 185. That is, as illustrated in FIG. 12, both ends of the frame coupling hole 194b may be open such that an end of the screw 185 does not interfere with the bottom chassis 88. For example, the screw 185 is not coupled to the bottom chassis or is not driven through the bottom chassis. Through this configuration, an aesthetically appealing appearance of the bottom chassis 188 may be obtained. In addition, since the bottom chassis 188 does not need to have another coupling hole for assembling of the display apparatus 1, damage to the inside of the display apparatus 1 caused by the external environment through the bottom chassis 188 may be prevented.

The frame seating portion 194 may have at least one frame coupling hole 194b or a plurality of frame coupling holes 194b arranged at predetermined intervals along the frame seating portion 194.

The side frame 190 may have a light source seating portion 196.

The light source seating portion 196 of the side frame 190 is disposed to face a side of the light guide plate 40. Particularly, the light source seating portion 196 may be formed on the frame seating portion 194 as a surface facing the side of the light guide plate 40. The light source supporting unit 134 may be supported by the light source seating portion 196 which will be described later. The light source 132 mounted on the light source supporting unit 134 may emit light toward the light guide plate 40.

The light source unit 130 may include the light source 132 and the light source supporting unit 134.

The light source 132 may include an LED. The light source supporting unit 134 may transmit an electric signal to the light source 132 to turn on/off the light source 132. The light source supporting unit 134 may include a PCB on which the light source 132 is mounted. According to an exemplary embodiment, the light sources 132 operate in a state of being linearly arranged on the light source supporting unit 134. The light source supporting unit 134 may be seated on the light source seating portion 196.

Hereinafter, a process of assembling the display apparatus 1 will be described.

The side frame 190 is coupled to the bottom chassis 188. In this case, the bottom chassis 188 may be integrally formed with the side frame 190 as described above.

The assembling may be performed such that the light guide plate 40, the optical sheet 60, and the display panel 20 may be sequentially disposed on the front surface of the bottom chassis 188.

The light source unit 130 may be seated on the light source seating portion 196 of the side frame 190. Particularly, the light source supporting unit 134 is seated on the light source seating portion 196 of the side frame 190, and the light source 132 may be mounted on the light source supporting unit 134 to face the side of the light guide plate 40.

The top chassis 182 may be disposed such that the panel supporting portion 183 of the top chassis 182 supports the display panel 20, the top chassis coupling portion 184 of the top chassis 182 faces the frame seating portion 194 of the side frame 190, and the light guide plate supporting portion 186 of the top chassis 182 supports the light guide plate 40.

As the screw 185 is inserted in to the insertion space 184*a* of the top chassis coupling portion 184, the top chassis coupling portion 184 and the frame seating portion 194 may be fixed by coupling using the screw 185.

Particularly, the screw 185 is inserted into the insertion space 184*a* of the top chassis coupling portion 184 exposed toward the display apparatus 1. The screw 185 is inserted into the top coupling hole 184*b* and the frame coupling hole 194*b* to be coupled with the top chassis 182 and the side frame 190.

The cover 50 is disposed on the front surface of the top chassis 182 to prevent the top chassis coupling portion 184 from being exposed to the outside.

Hereinafter, another exemplary embodiment will be described.

In this regard, description presented above will not be repeated.

Figure 13:
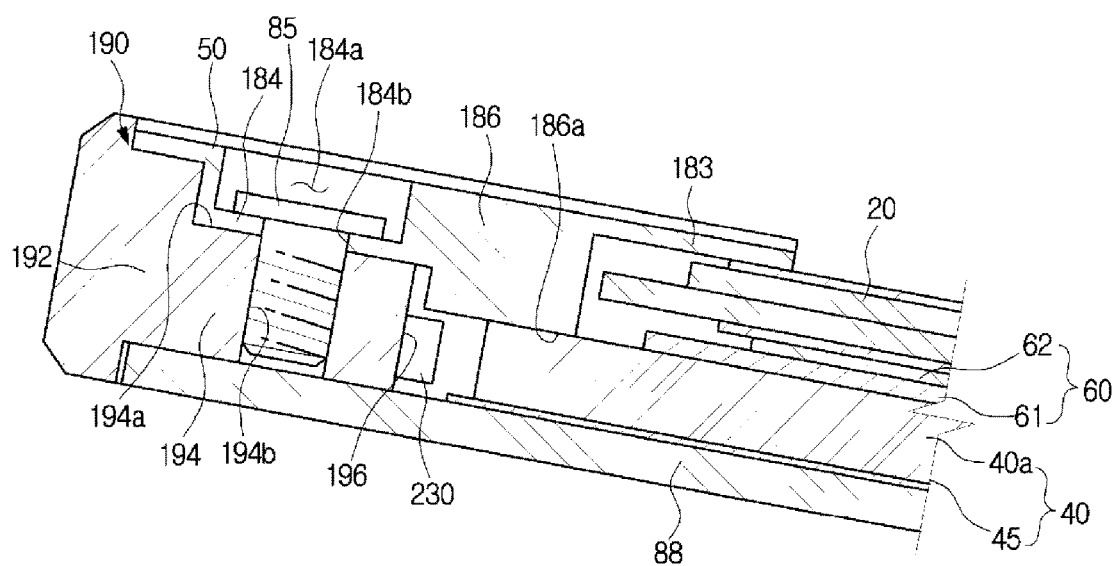
FIG. 13 is a cross-sectional view illustrating a display apparatus according to another exemplary embodiment.

FIG. 13 is a cross-sectional view illustrating a display apparatus according to another exemplary embodiment.

As illustrated in FIG. 13, a light source unit 230 may include a chip on board (COB) LED. The light source unit 230 may be disposed on the light source seating portion 196 to emit light toward the light guide plate 40.

Hereinafter, another exemplary embodiment will be described.

In this regard, description presented above will not be repeated.

Figure 14:
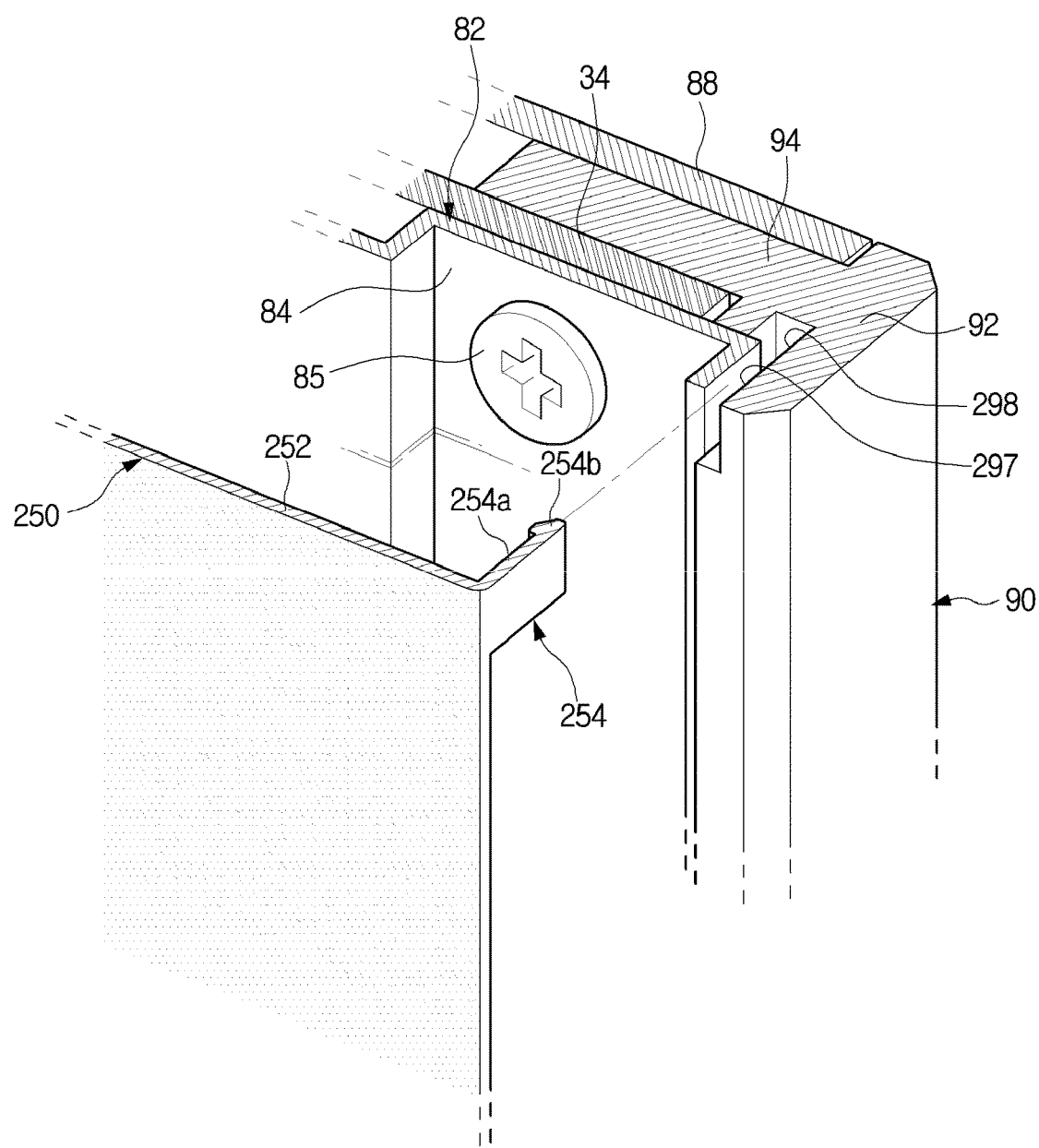
FIG. 14 is a diagram illustrating a cover of a display apparatus according to another exemplary embodiment.
Figure 15:
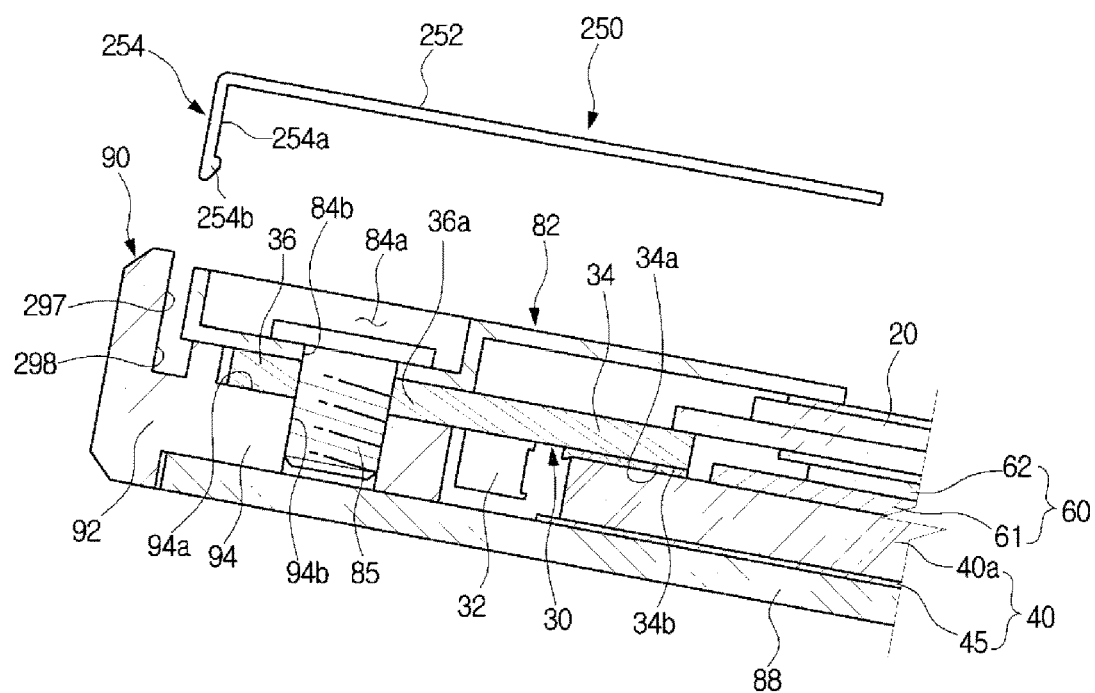
FIGS. 15 and 16 are diagrams for describing coupling of the cover of the display apparatus.
Figure 16:
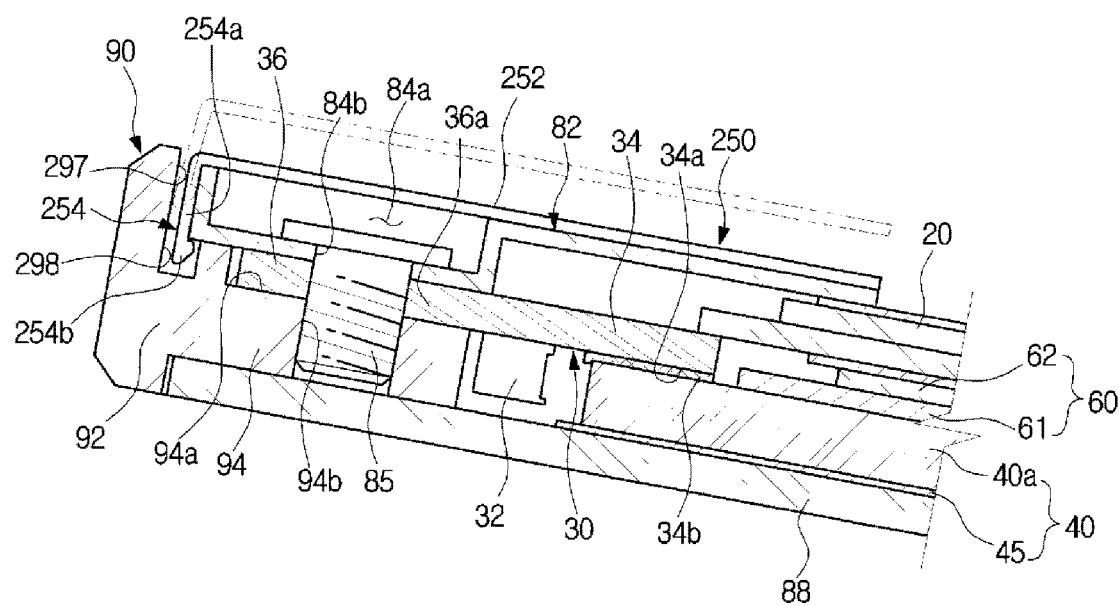

FIG. 14 is a diagram illustrating a cover of a display apparatus according to another exemplary embodiment. FIGS. 15 and 16 are diagrams for describing coupling of the cover of the display apparatus.

The chassis 80 may include a cover 250, at least one portion of which covers the front surface of the top chassis 82. The cover 250 may cover the insertion space 84*a* of the top chassis coupling portion 84 to obtain an aesthetically appealing appearance.

The cover 250 may be formed of at least one material selected from the group consisting of a film, metal, and plastic. The material used to form the cover 250 is not limited thereto, and the cover 250 covers at least one portion of the front surface of the top chassis 82 to prevent the top chassis coupling portion 84 from being exposed to the outside.

The cover 250 may be permanently attached to the top chassis 82 or detachably coupled or attachable and detachable from the top chassis 82. However, methods of covering the front surface of the top chassis 82 by using the cover 250 are not limited thereto.

The cover 250 may include a front cover 252 and a fixing cover 254.

The front cover 252 may cover at least one portion of the front surface of the top chassis 82. The cover 250 may cover the insertion space 84*a* of the top chassis coupling portion 84 and the panel supporting portion 83.

The fixing cover 254 may extend from the front cover 252. Particularly, the fixing cover 254 may extend from the front cover 252 to be bent therefrom. The fixing cover 254 is formed such that the cover 250 supports the top chassis 82 on the front surface thereof. That is, the fixing cover 254 may be formed such that the cover 250 is detachably coupled to the top chassis 82 or attachable and detachable from the top chassis 82.

The fixing cover 254 may have an extension portion 254*a* and a head portion 254*b*.

Before describing the fixing cover 254, the side frame 90 may have an insertion hole 297 and a holding portion 298 for insertion and fixing of the fixing cover 254. The insertion hole 297 may be formed as a gap with a predetermined size between the top chassis 82 and the side frame 90. The holding portion 298 may be formed to have a greater width than the insertion hole 297. According to the present exemplary embodiment, the insertion hole 297 and the holding portion 298 are disposed at the frame body 92 of the side frame 90, without being limited thereto. For example, the insertion hole 297 and the holding portion 298 may be formed between the frame body 92 and the top chassis 82 in any configuration as long as the fixing cover 254 is inserted into the display module 10.

The extension portion 254*a* of the fixing cover 254 may be formed by bending and extending from the front cover 252. Through this configuration, the extension portion 254*a* may be inserted into the display apparatus 1 when the front cover 252 is disposed on the front surface of the top chassis 82. Particularly, the extension portion 254*a* may be inserted into the insertion hole 297.

The head portion 254*b* may be formed at the end of the extension portion 254*a* to be held by the holding portion 298 after the extension portion 254*a* is inserted into the insertion hole 297. The head portion 254*b* may have a greater thickness than the extension portion 254*a* to be held by the holding portion 298. The head portion 254*b* may have elasticity to pass through the insertion hole 297, which has a smaller width than the holding portion 298. The head portion 254*b* itself may have elasticity, or the fixing cover 254 may have elasticity to stretch out from the front cover 252.

Hereinafter, another exemplary embodiment will be described.

In this regard, description presented above will not be repeated.

Figure 17:
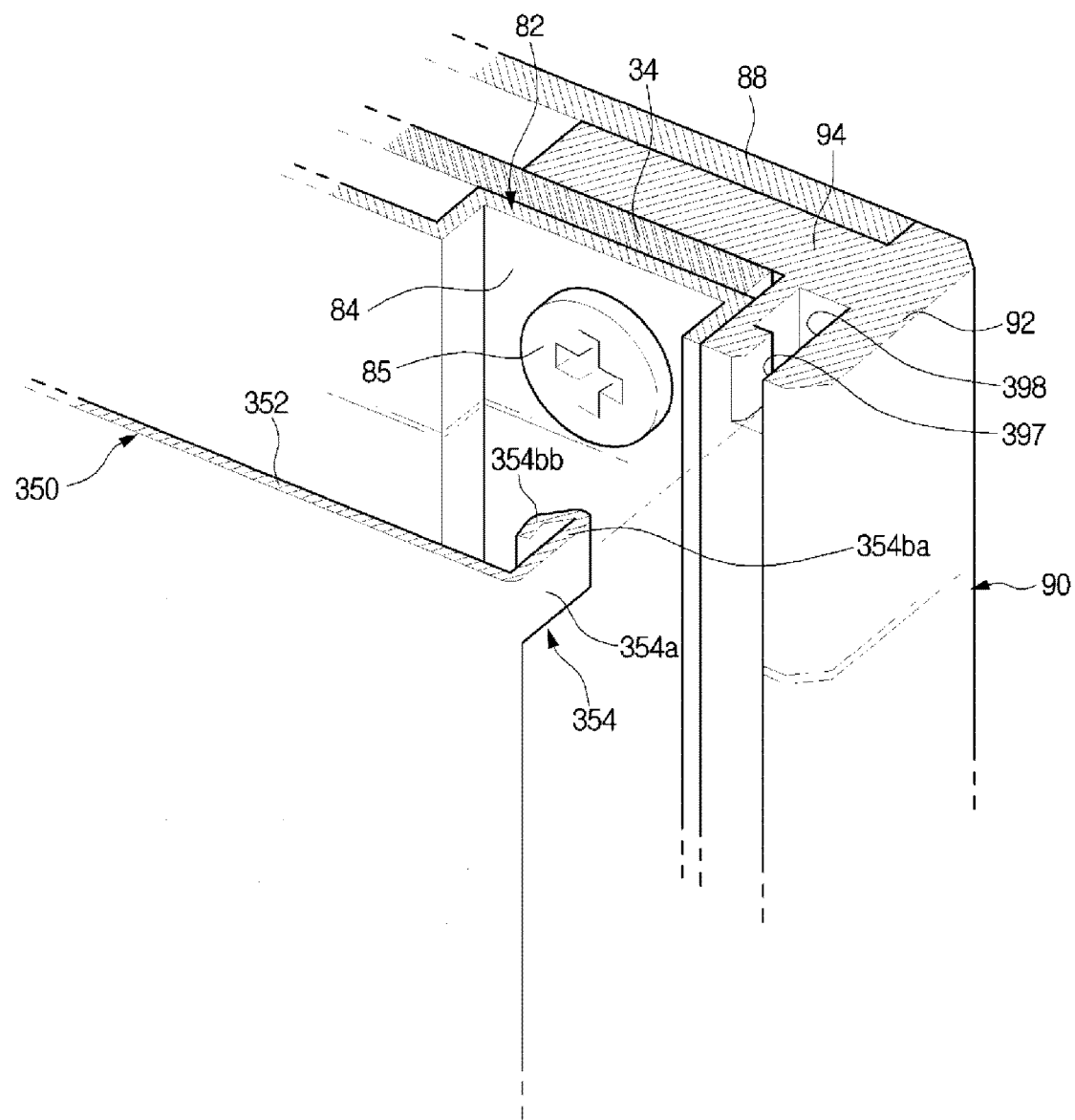
FIG. 17 is a diagram illustrating a cover of a display apparatus according to another exemplary embodiment.
Figure 18:
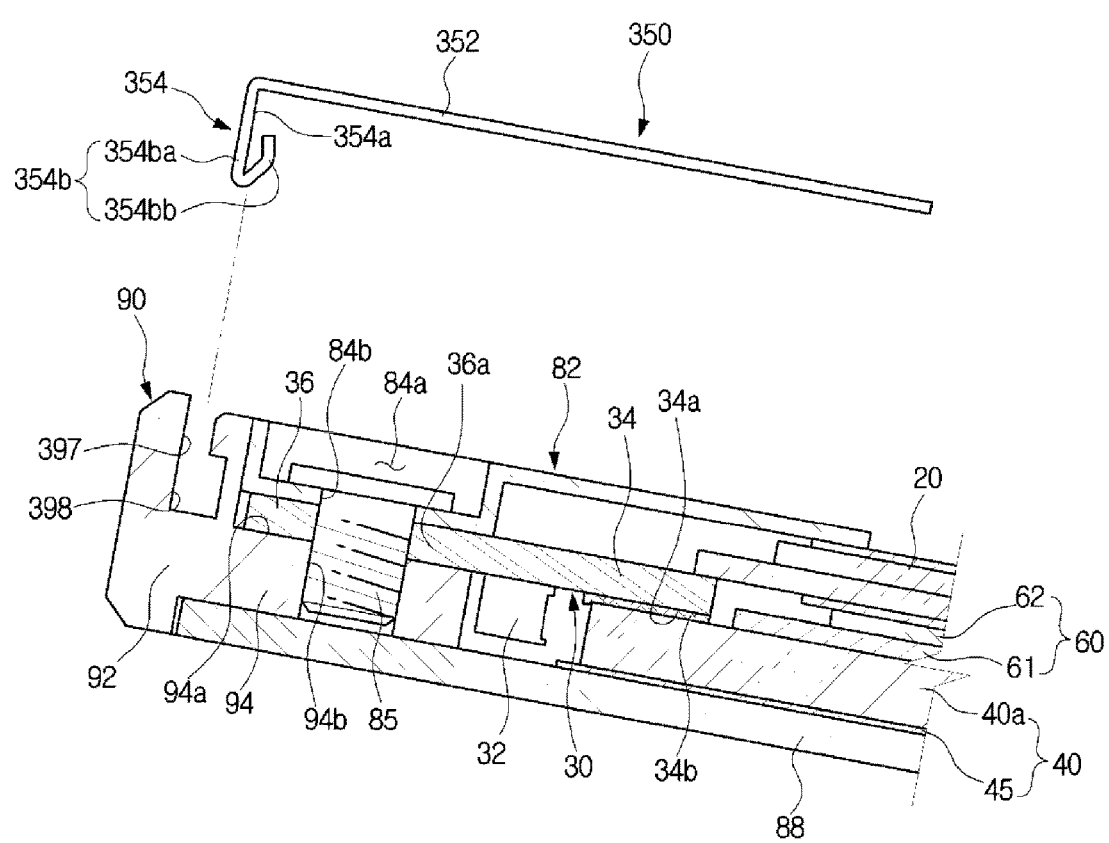
FIGS. 18 and 19 are diagrams for describing coupling of the cover of the display apparatus.
Figure 19:
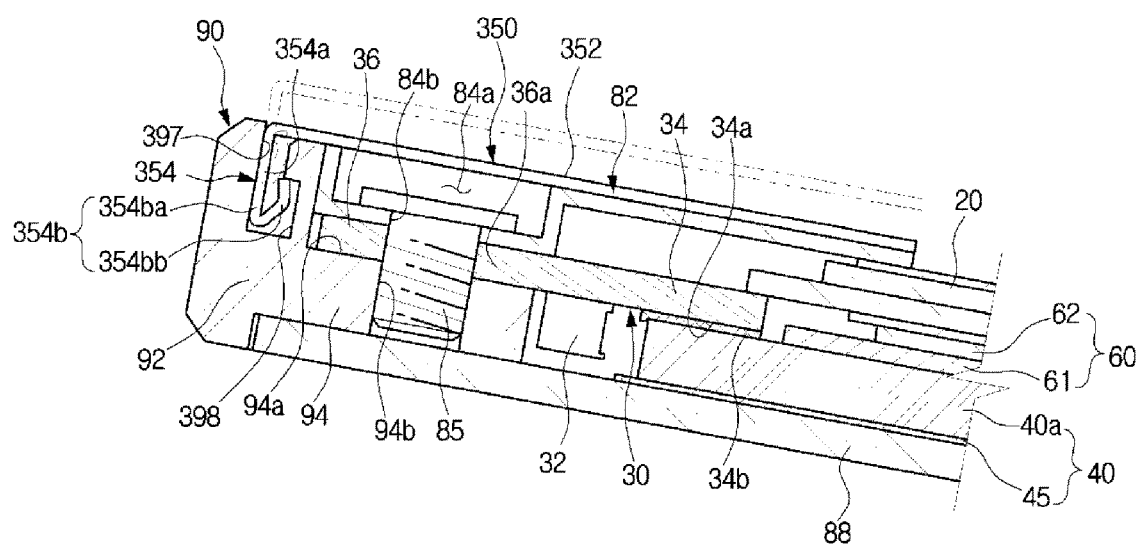

FIG. 17 is a diagram illustrating a cover of a display apparatus according to another exemplary embodiment. FIGS. 18 and 19 are diagrams for describing coupling of the cover of the display apparatus.

A cover 350 may include a front cover 352 and a fixing cover 354.

The fixing cover 354 may have an extension portion 354a and a head portion 354b.

Before describing the fixing cover 354, the side frame 90 may have an insertion hole 397 and a holding portion 398 for insertion and fixing of the fixing cover 354. The insertion hole 397 may be formed as a gap with a predetermined size between the top chassis 82 and the side frame 90. The holding portion 398 may be formed to have a greater width than the insertion hole 397. According to an exemplary embodiment, the insertion hole 397 and the holding portion 398 are disposed at the frame body 92 of the side frame 90, without being limited thereto. For example, the insertion hole 397 and the holding portion 398 may be formed between the frame body 92 and the top chassis 82 in any configuration as long as the fixing cover 254 is inserted into the display module 10.

The extension portion 354a of the fixing cover 354 may be formed by bending and extending from the front cover 352. Through this configuration, the extension portion 354a may be inserted into the display apparatus 1 when the front cover 352 is disposed on the front surface of the top chassis 82. Particularly, the extension portion 354a may be inserted into the insertion hole 397.

The head portion 354b may be formed at the end of the extension portion 354a to be held by the holding portion 398 after the extension portion 354a is inserted into the insertion hole 397. The head portion 354b may have a greater thickness than the extension portion 354a to be held by the holding portion 398. The head portion 354b may have elasticity to pass through the insertion hole 397, which has a smaller width than the holding portion 398.

The head portion 354b has a shape in which the end of the extension portion 354a is folded. That is, the head portion 354b may be formed by a hemming process. The head portion 354b may have an outer head portion 354ba extending from the extension portion 354a and an inner head portion 354bb extending from the outer head portion 354ba and having a folded shape in which at least one portion of the inner head portion 354bb is spaced apart from the outer head portion 354ba at a predetermined distance.

The outer head portion 354ba and the inner head portion 354bb are arranged to be spaced apart from each other at least in part when an external force is not applied thereto. While the head portion 354b passes through the insertion hole 397, the outer head portion 354ba and the inner head portion 354bb are pressed by the inner walls of the insertion hole 397 to be closer to each other. After the head portion 354b passes through the insertion hole 397, the outer head portion 354ba and the inner head portion 354bb elastically return to be spaced apart from each other at least in part.

According to the present exemplary embodiment, the head portion 354b has a hemming structure. However, the shape of the head portion 354b is not limited thereto, the head portion 354b may have any shape held by the holding portion 398.

Hereinafter, another exemplary embodiment will be described.

In this regard, description presented above will not be repeated.

Figure 20:
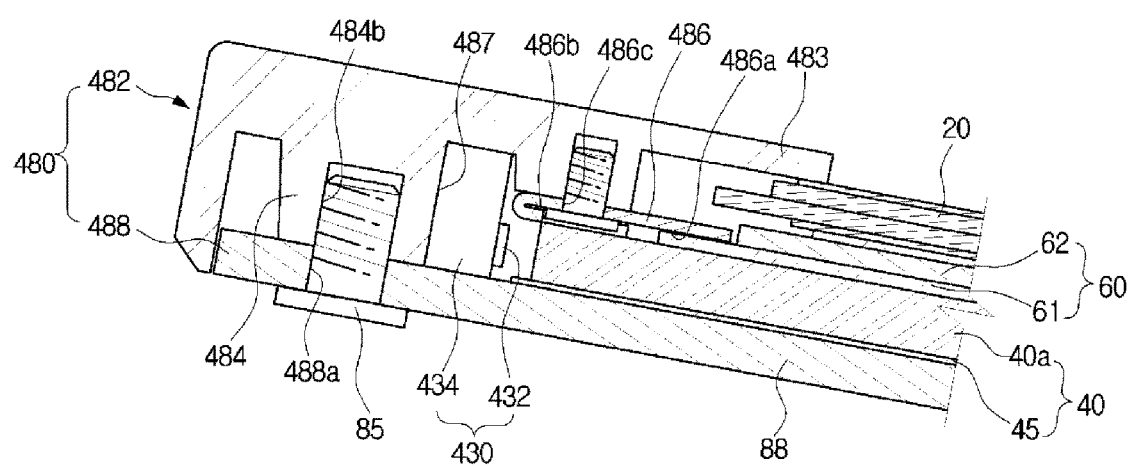
FIG. 20 is a cross-sectional view illustrating a display apparatus according to another exemplary embodiment.
Figure 21:
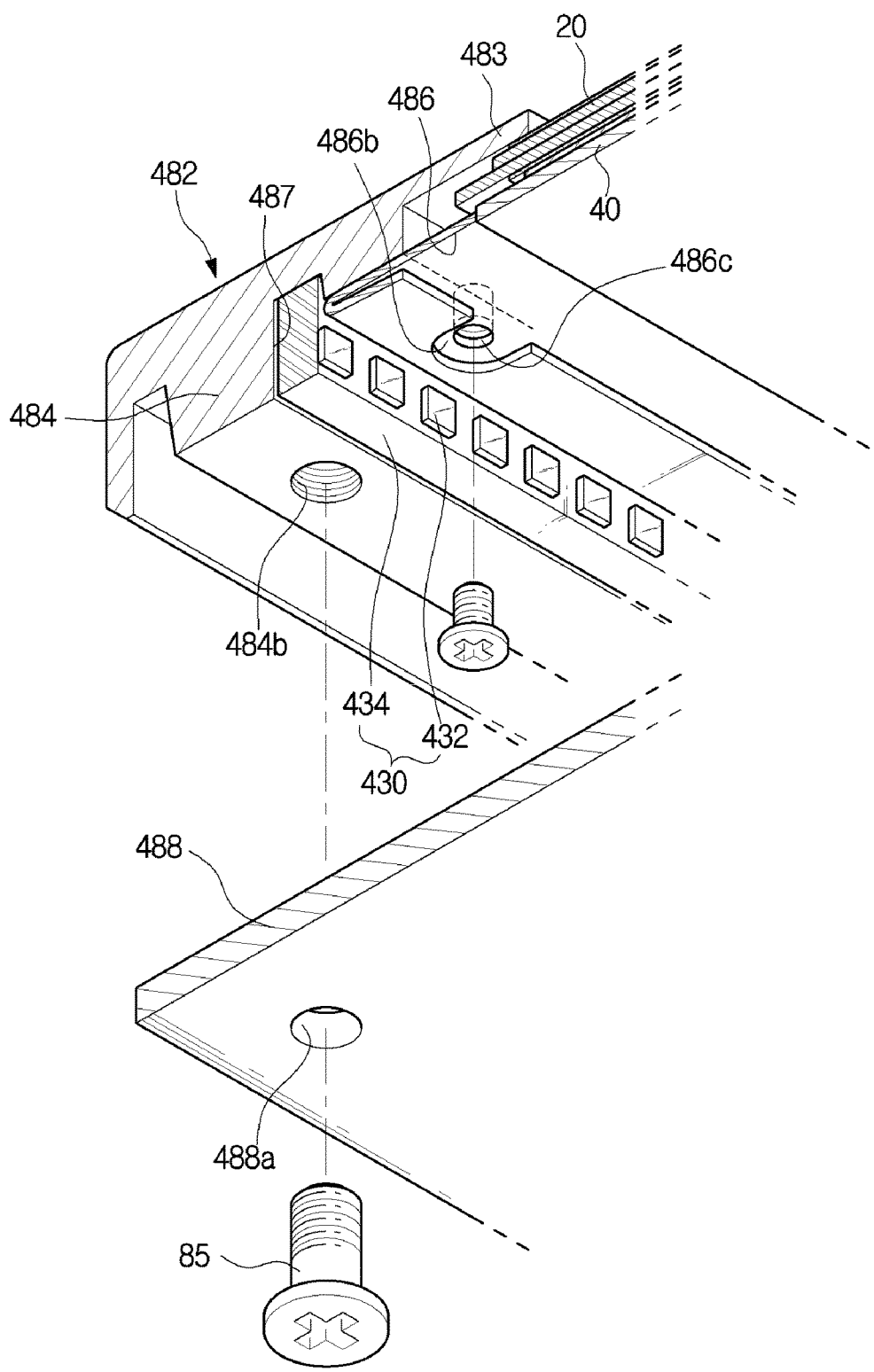
FIG. 21 is a diagram illustrating coupling of the display apparatus.

FIG. 20 is a cross-sectional view illustrating a display apparatus according to another exemplary embodiment. FIG. 21 is a diagram illustrating coupling of the display apparatus.

A chassis 480 may include a top chassis 482 and a bottom chassis 488. A top chassis 482 may include a panel supporting portion 483, a light guide plate supporting portion 486, and a top chassis coupling portion 484.

The panel supporting portion 483 may support at least one portion of the display panel 20. Particularly, the panel supporting portion 483 may support an edge portion of the display panel 20.

The top chassis coupling portion 484 extends from the panel supporting portion 483 to be coupled with a bottom chassis 488. The top chassis coupling portion 484 may be disposed to face the bottom chassis 488.

The top chassis coupling portion 484 may have at least one top coupling hole 484b. The top coupling hole 484b may be formed to be open at the rear surface of the display module 10 differently from those described above. A plurality of top coupling holes 484b may be disposed along the top chassis coupling portion 484 at predetermined intervals.

The light guide plate supporting portion 486 may support at least one portion of the light guide plate 40. Although the light guide plate supporting portion 186 is integrally formed with the top chassis 182 according to the exemplary embodiment illustrated in FIGS. 11 and 12, the light guide plate supporting portion 486 may be formed as a separated panel according to the present exemplary embodiment.

Particularly, one end of the light guide plate supporting portion 486, formed as a separate panel, is detachably coupled to the top chassis 482 or attachable and detachable from the top chassis 82, and the other end thereof supports the light guide plate 40. The light guide plate supporting portion 486 may include a panel coupling portion 485b coupled to the top chassis 482 and a light guide plate supporting surface 486a to support the light guide plate 40. The panel coupling portion 486b may have a panel coupling hole 486c for coupling with the top chassis 482 and may be coupled to the top chassis 482 by screw-coupling through the panel coupling hole 486c.

The top chassis 482 may have a light source seating portion 487.

The light source seating portion 487 of the top chassis 482 is formed to face a side of the light guide plate 40. Particularly, the light source seating portion 487 may be formed on the top chassis coupling portion 484 as a surface facing the side of the light guide plate 40. A light source supporting unit 434 of a light source unit 430 may be supported by the light source seating portion 487 which will be described later. A light source 432 mounted on the light source supporting unit 434 emits light toward the light guide plate 40. The light source unit 430 may include the light source 432 and the light source supporting unit 434.

The bottom chassis 488 may have a bottom coupling hole 488a to correspond to the top coupling hole 484b.

Hereinafter, a process of assembling the display apparatus 1 will be described.

The display panel 20, the optical sheet 60, and the light guide plate 40 may be sequentially disposed on the top chassis 482.

The light guide plate supporting unit 486 is mounted on the top chassis 482, and the light guide plate 40 is disposed to be supported by the light guide plate supporting unit 486. The light guide plate supporting portion 486 may be fixed to the top chassis 482 by coupling the panel coupling portion 486b to the top chassis 482 by using a screw 485.

The light source unit 430 is installed to be supported by the light source seating portion 487 of the top chassis 482. The light source 432 of the installed light source unit 430 is disposed to emit light toward the light guide plate 40.

Then, the bottom coupling hole 488a of the bottom chassis 488 and the top coupling hole 484b of the top chassis coupling portion 484 are coupled with each other by using the screw 485.

Hereinafter, another exemplary embodiment will be described.

In this regard, description presented above will not be repeated.

Figure 22:
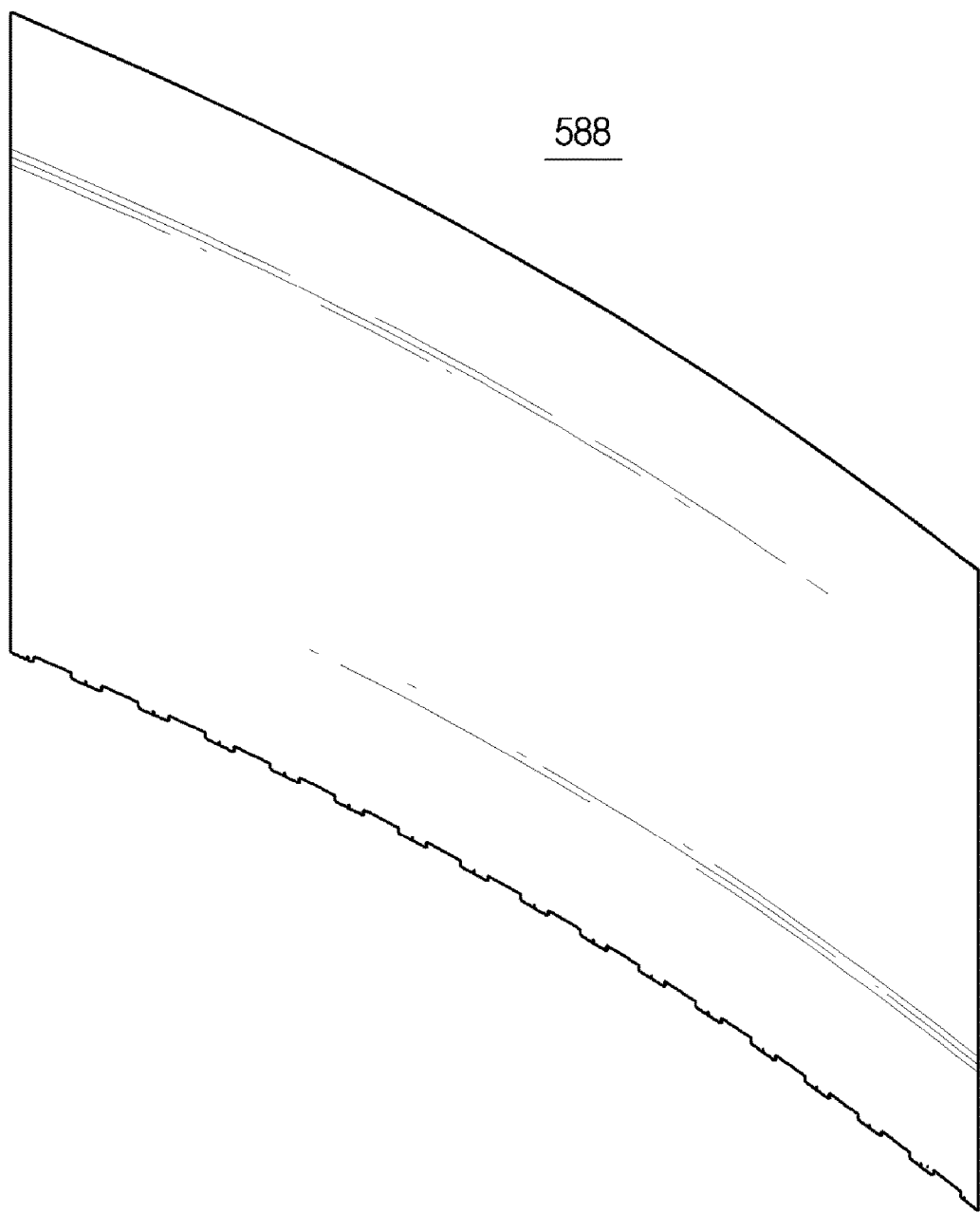
FIG. 22 is a perspective view illustrating a bottom chassis of a display apparatus according to another exemplary embodiment.
Figure 23:
FIG. 23 is a top view illustrating the bottom chassis of the display apparatus.
Figure 24:
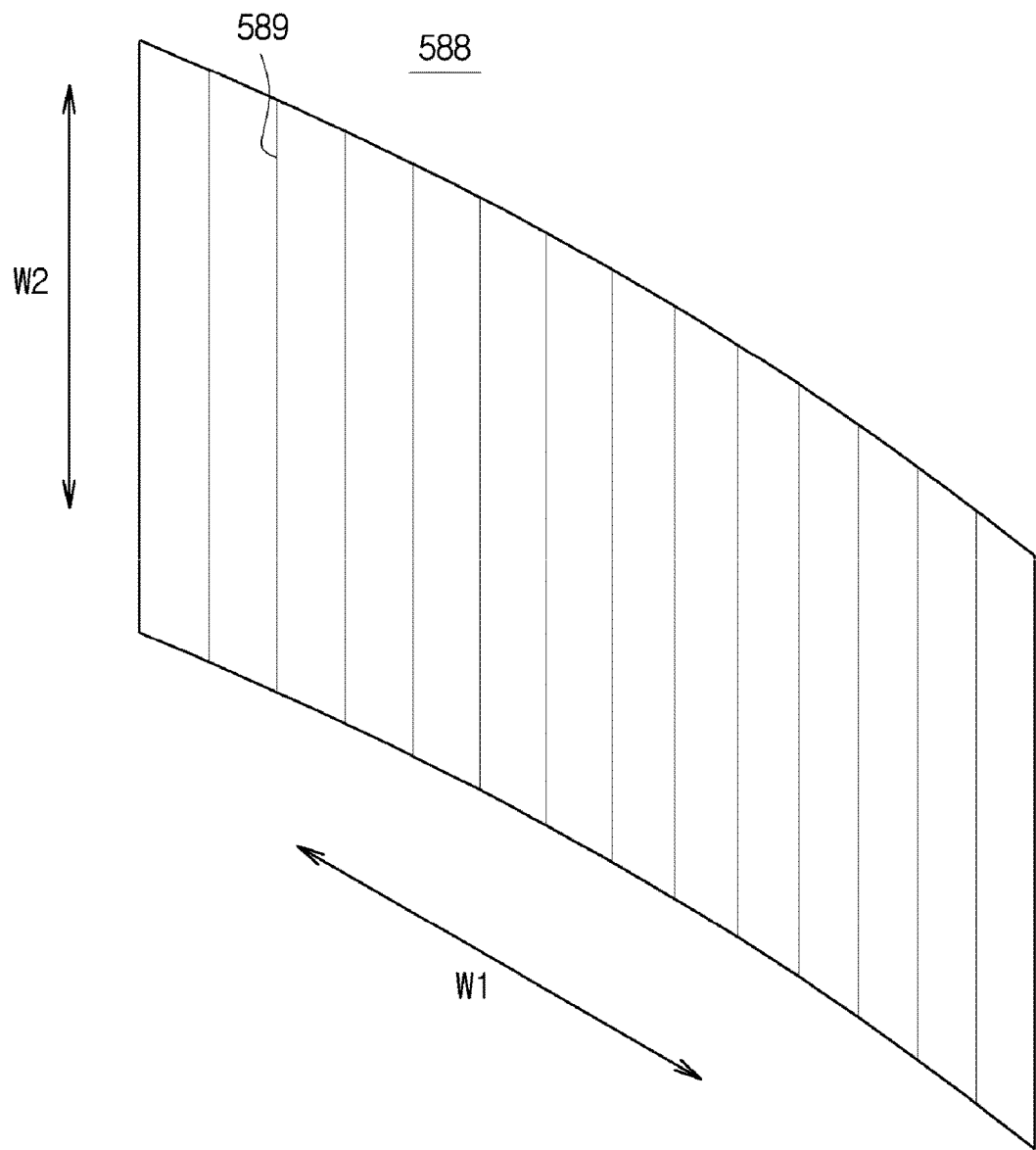
FIG. 24 is a diagram illustrating a pattern portion of the bottom chassis of the display apparatus.
Figure 26:
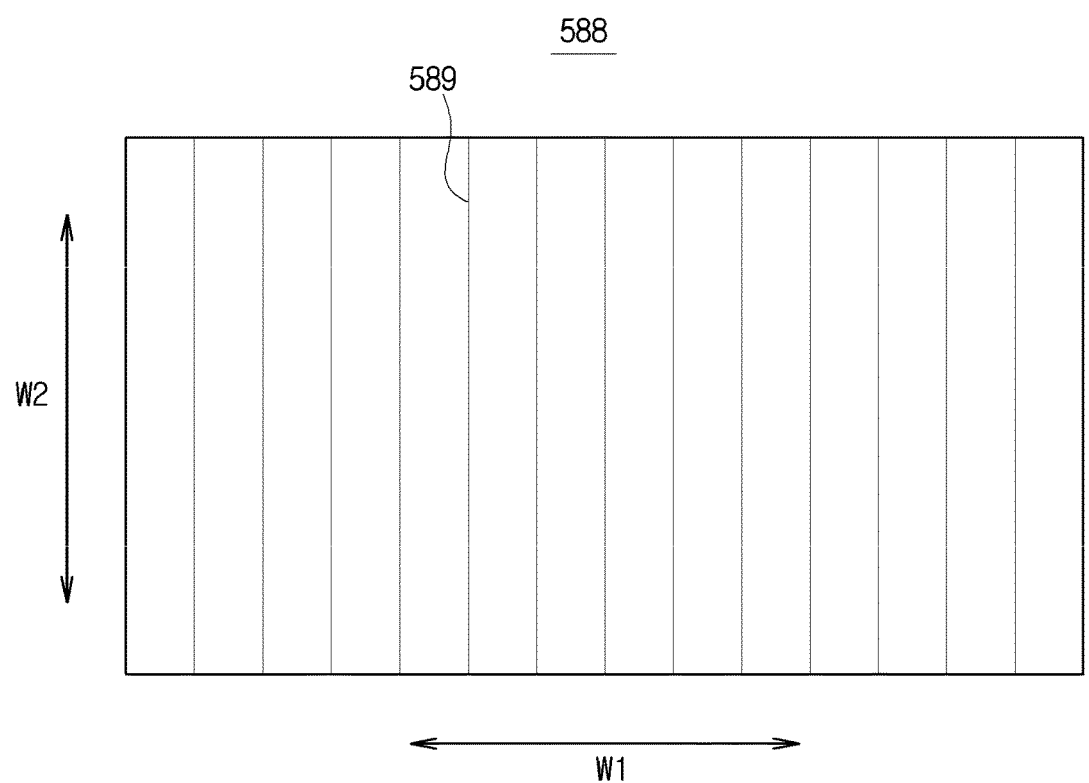
FIGS. 26 and 27 are diagrams illustrating pattern portions of the bottom chassis.
Figure 27:
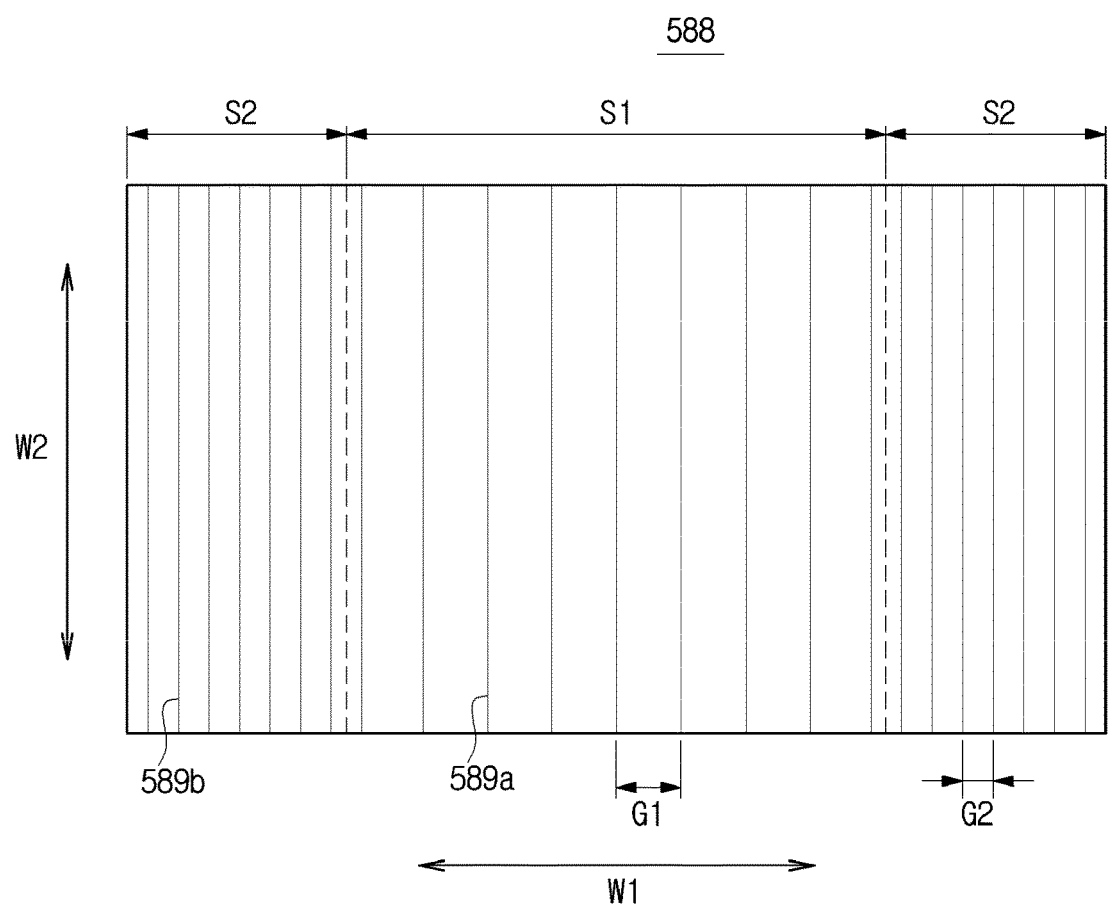
Figure 28:
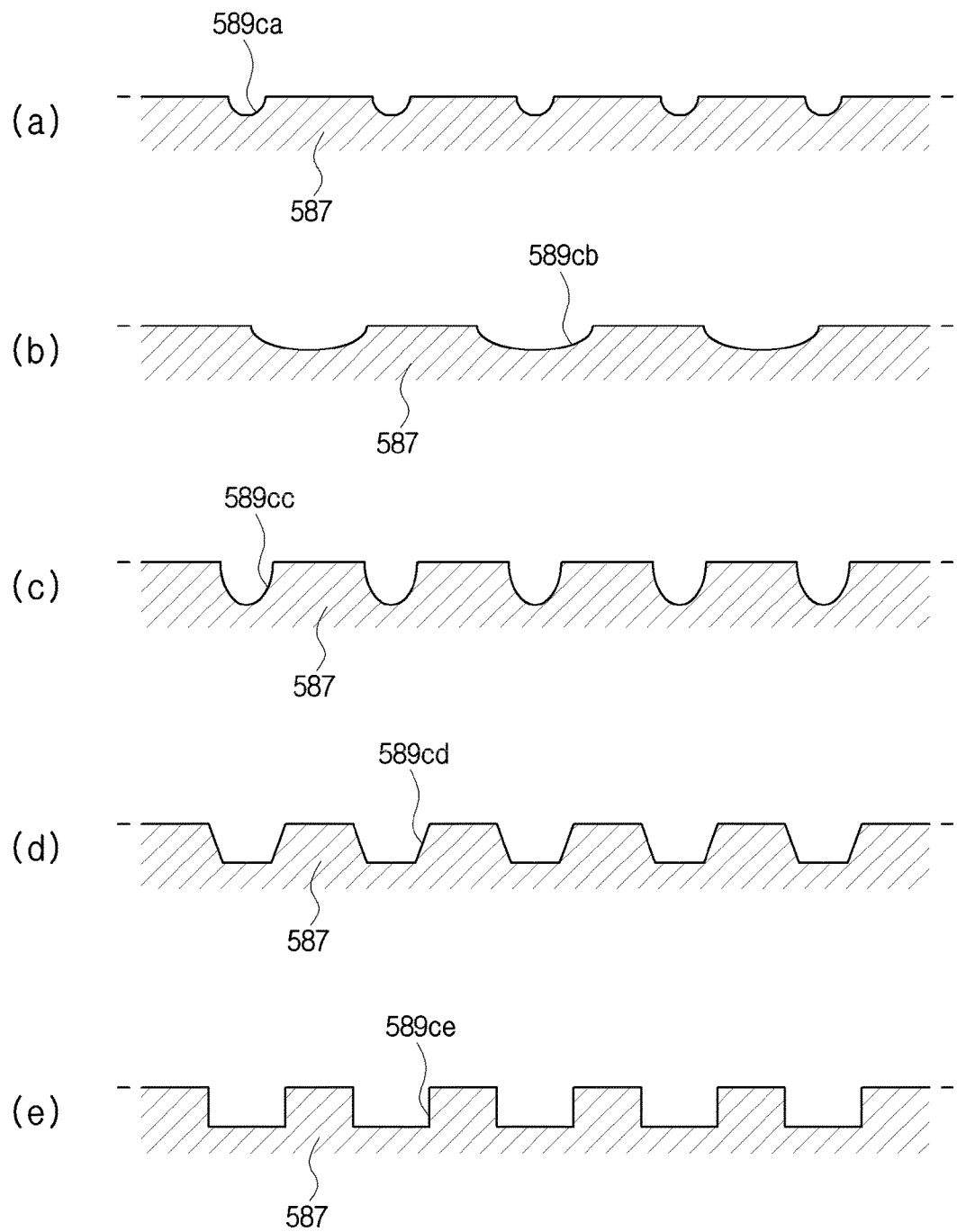
FIGS. 28A-28E are diagrams illustrating different shapes of the pattern portions of the bottom chassis.

FIG. 22 is a perspective view illustrating a bottom chassis of a display apparatus according to another exemplary embodiment. FIG. 23 is a top view illustrating the bottom chassis of the display apparatus. FIG. 24 is a diagram illustrating a pattern portion of the bottom chassis of the display apparatus. FIGS. 25A and 25B are diagrams for describing manufacturing of the bottom chassis. FIGS. 26 and 27 are diagrams illustrating pattern portions of the bottom chassis. FIGS. 28A-28E are diagrams illustrating different shapes of the pattern portions of the bottom chassis.

The bottom chassis 588 may have a curved shape. The bottom chassis 588 may be curved by forming an engraved pattern portion 589 on the bottom chassis 588 and plastically deforming the bottom chassis 588.

The curved bottom chassis 588 may be manufactured by pressing. However, since a size of a pressing machine needs to be increased in proportion to that of the bottom chassis 588, and a type of the pressing machine also needs to be changed in accordance with a curvature of the bottom chassis 588, the pressing process is not efficient in terms of time and costs. Thus, the method of manufacturing the chassis 80 according to exemplary embodiments as described above may be applied thereto.

For descriptive convenience, this method is applied to the bottom chassis 588. However, the method may also be applied to the top chassis 82 and any components to be curved.

The bottom chassis 588 may have the pattern portion 589 in at least one region thereof. The pattern portion 589 may be formed in at least one portion of the bottom chassis 588 to provide a curvature thereto. The pattern portion 589 may be formed perpendicularly to a direction using the curvature. The bottom chassis 588 may be plastically deformed by the pattern portion 589 thereby maintaining the curvature of the bottom chassis 588.

Patterns of the pattern portion 589 may be arranged in a first direction W1 and extended in a second direction W2, which is different from the first direction W1, in at least one portion of the bottom chassis 588 to form a curvature in the first direction W1.

The first direction W1 and the second direction W2 are not the same and different from each other. According to the present exemplary embodiment, the pattern portion 589 may be formed on the bottom chassis 588 such that the first direction W1 is perpendicular to the second direction W2.

The pattern portion 589 may be formed using engraved patterns. A plurality of engraved patterns may be arranged in at least one portion of the bottom chassis 588 in the first direction W1. In addition, the engraved patterns of the pattern portion 589 may extend in the second direction W2. That is, the pattern portion 589 may be formed such that patterns extend in the second direction W2 and are arranged in the first direction W1.

Although the pattern portion 589 formed as lines extending in the second direction W2 in parallel is described according to the present exemplary embodiment, the shape of the pattern portion 589 is not limited thereto.

When the pattern portion 589 is formed on a plate 587 and one surface of the plate 587 having the pattern portion 589 is bent, the plate 587 has a curvature resulting in preparing the bottom chassis 588 having the curvature.

The pattern portion 589 of the bottom chassis 588 may be divided into sections having different shapes, different pitches between the plurality of engraved patterns, and different depths of the engraved patterns. The curvature increases as the pattern portion 589 has deeper engraved patterns and as the pitch between the engraved patterns decreases.

While the pattern portion 589 may be formed using patterns arranged at constant intervals and have the same curvature in all sections on the bottom chassis 588 as illustrated in FIG. 26, the sections may have different curvatures as illustrated in FIG. 27.

The bottom chassis 588 may have a first section S1 located in the middle of the bottom chassis 588 in the first direction W1 and second sections S2 located adjacent to the first section S1. A pair of second sections S2 may be disposed at both sides of the first section S1.

A radius of curvature R1 of the first section S1 may be greater than a radius of curvature R2 of the second sections S2.

Particularly, when patterns of the first section S1 are referred to as a first pattern portion 589a, and patterns of the second sections S2 are referred to as a second pattern portion 589b, the first pattern portion 589a may be formed to have a pitch with a first interval G1, and the second pattern portion 589b may be formed to have a pitch with a second interval G2 smaller than the first interval G1.

Although the radius of curvature R1 of the first section S1 is greater than the radius of curvature R2 of the second sections S2, they are not limited thereto. For example, the radius of curvature R1 may be the same as or smaller than the radius of curvature R2.

For descriptive convenience, the curvature was described based on the pitch intervals of the first pattern portion 589a and the second pattern portion 589b. However, the curvature of the sections may vary according to the depth of the engraved patterns or the shape of the engraved patterns.

The engraved patterns of the pattern portion 589 may have various cross-sectional shapes such as a circle 589ca, a horizontal oval 589cb, a vertical oval 589cc, a trapezoid 589cd, and a rectangle 589ce as illustrated in FIGS. 28A-28E. However, the engraved patterns may have any other cross-sectional shapes.

Hereinafter, one method of manufacturing the bottom chassis 588 will be described.

Figure 29:
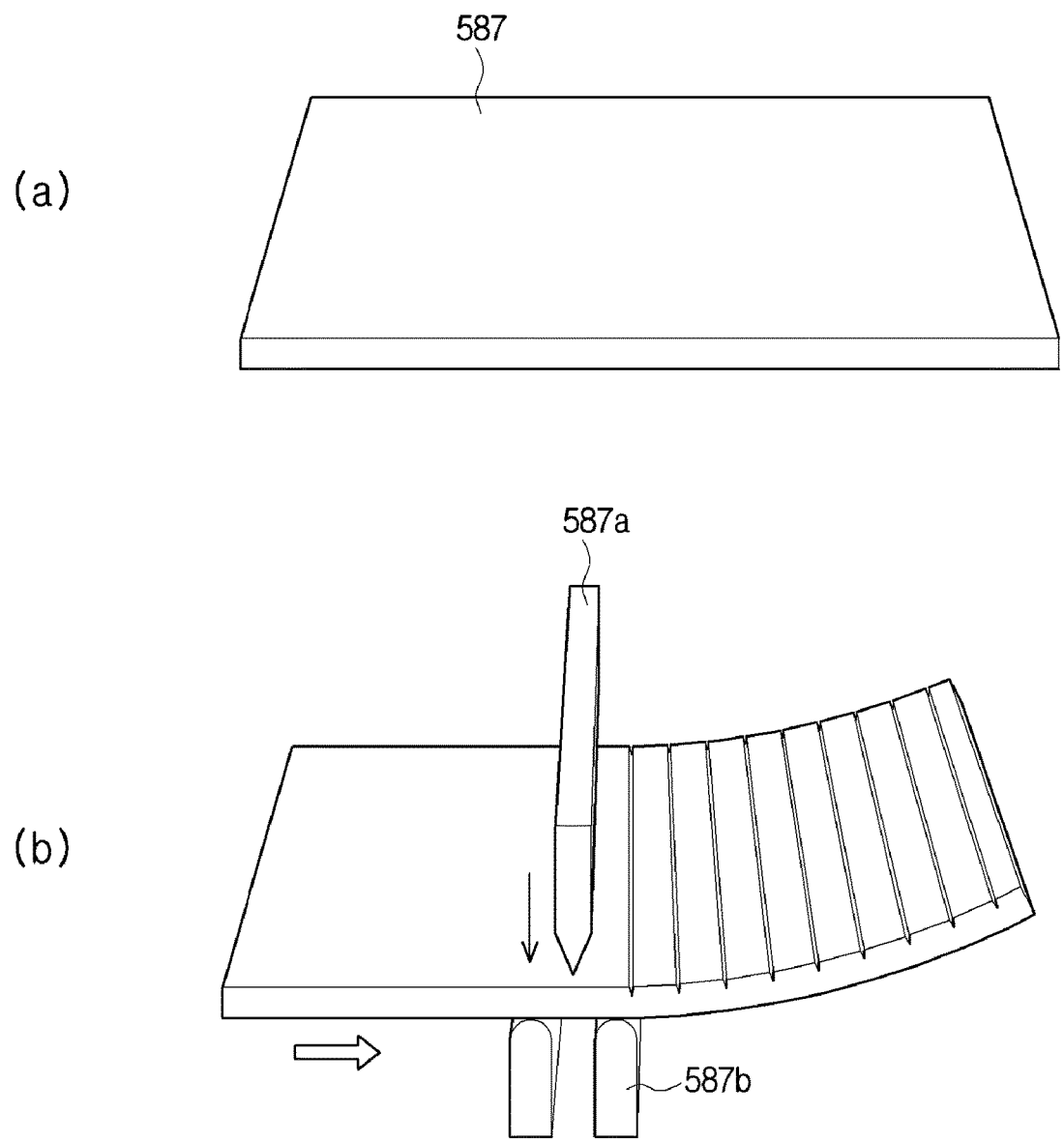
FIGS. 29A and 29B are diagrams for describing manufacturing of a bottom chassis according to another exemplary embodiment.

FIGS. 29A and 29B are diagrams for describing manufacturing of a bottom chassis according to another exemplary embodiment.

The pattern portion 589 is formed as illustrated in FIG. 29B on the plate 587 illustrated in FIG. 29A.

The pattern portion 589 may be formed such that the patterns of the pattern portion 589 are arranged in the first direction W1 and extended in the second direction W2 different from the first direction W1 on one surface of the plate 587. According to the present exemplary embodiment, the first direction W1 is perpendicular to the second direction W2.

The bottom chassis 588 having a curvature is formed by forming the pattern portion 589 on the plate 587 and plastically deforming the plate 587 by bending the surface of the plate 587 on which the pattern portion 589 is formed. The pattern portion 589 may be formed using a plurality of engraved patterns having a linear shape and arranged in parallel.

Although the pattern portion 589 may be formed using various methods, a punching process may be applied to the present exemplary embodiment as illustrated in the drawings.

One surface of the plate 587 is punching-processed by a punching tool 587a, and a pair of punching support units 587b are disposed on the other surface of the plate 587 at both sides of a punching-processed region.

While the surface of the plate 587 is punching-processed, the both sides of the punching-processed region are supported by the punching support unit 587b on the other surface of the plate 587. In this process, a bending process of the plate 587 is simultaneously performed with the punching process.

The punching process proceeds in the first direction W1 of the plate 587 while forming the pattern portion 589, which extends in the second direction W2 of the plate 587.

The pattern portion 589 may have the first pattern portion 589a formed in the first section S1 and having the pitch with the first interval G1 and the second pattern portion 589b formed in the second sections S2 and having the pitch with the second interval G2, which is smaller than the first interval G1, as described above.

These sections may have different pitches by changing a speed of the punching process or a moving speed of the plate 587. Particularly, the speed of the punching process or the moving speed of the plate 587 may be reduced in the first section S1, and the speed of the punching process or the moving speed of the plate 587 may be increased in the second sections S2 to be greater than that of the first section S1 to obtain the results described above.

Although formation of the first pattern portion 589a and the second pattern portion 589b is described above based on the intervals of pitches for descriptive convenience, the exemplary embodiment is not limited thereto. The curvature may be modified by changing depth of the engraved patterns or the shape of the engraved patterns. In this case, the depth of the engraved patterns may be modified by changing intensity of the punching process, or the shape of the engraved patterns may be modified by changing the type of the punching tool 587a.

Hereinafter, another exemplary embodiment will be described.

In this regard, description presented above will not be repeated.

Hereinafter, another method of manufacturing the bottom chassis 88 will be described.

Figure 30:
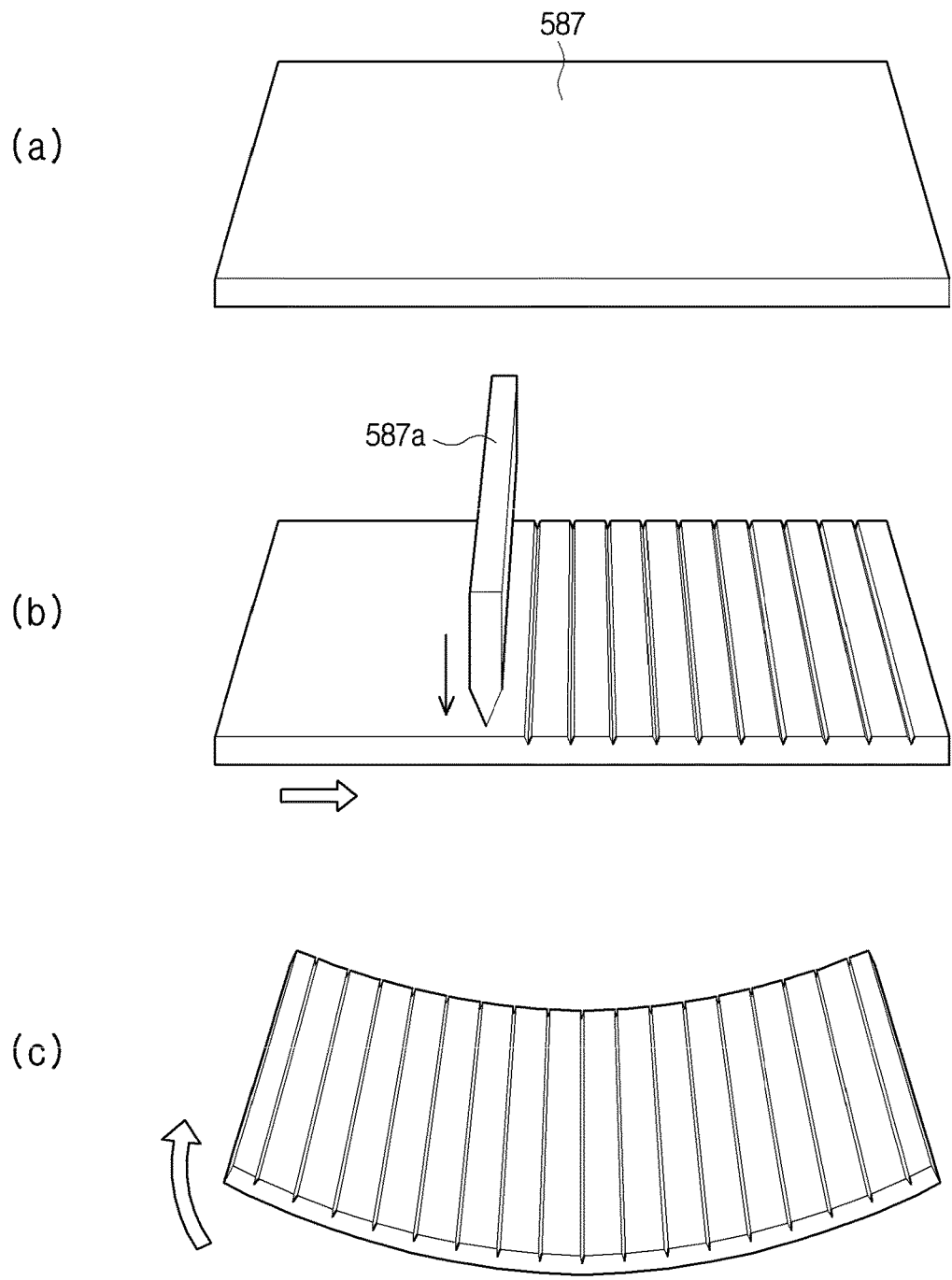
FIGS. 30A-30C are diagrams for describing manufacturing of a bottom chassis according to another exemplary embodiment.

FIGS. 30A-30C are diagrams for describing manufacturing of a bottom chassis according to another exemplary embodiment.

The pattern portion 589 is formed on one surface of the plate 587 by arranging patterns in the first direction W1 and extending the patterns in the second direction W2 different from first direction W1. According to the present exemplary embodiment, the first direction W1 is perpendicular to the second direction W2.

The bottom chassis 588 having a curvature is formed by forming the pattern portion 589 on the plate 587 and plastically deforming the plate 587 by bending the surface of the plate 587 on which the pattern portion 589 is formed. The pattern portion 589 may be formed using a plurality of engraved patterns having a linear shape and arranged in parallel.

A process of forming the pattern portion 589 on the plate 587 by using the punching tool 687a and a process of plastically deforming the plate 587 by bending the surface of the plate 587 on which the pattern portion 589 is formed may be separately performed.

A fine process may be performed by separately performing the manufacturing process as describe above.

Hereinafter, another exemplary embodiment will be described.

In this regard, description presented above will not be repeated.

Figure 31:
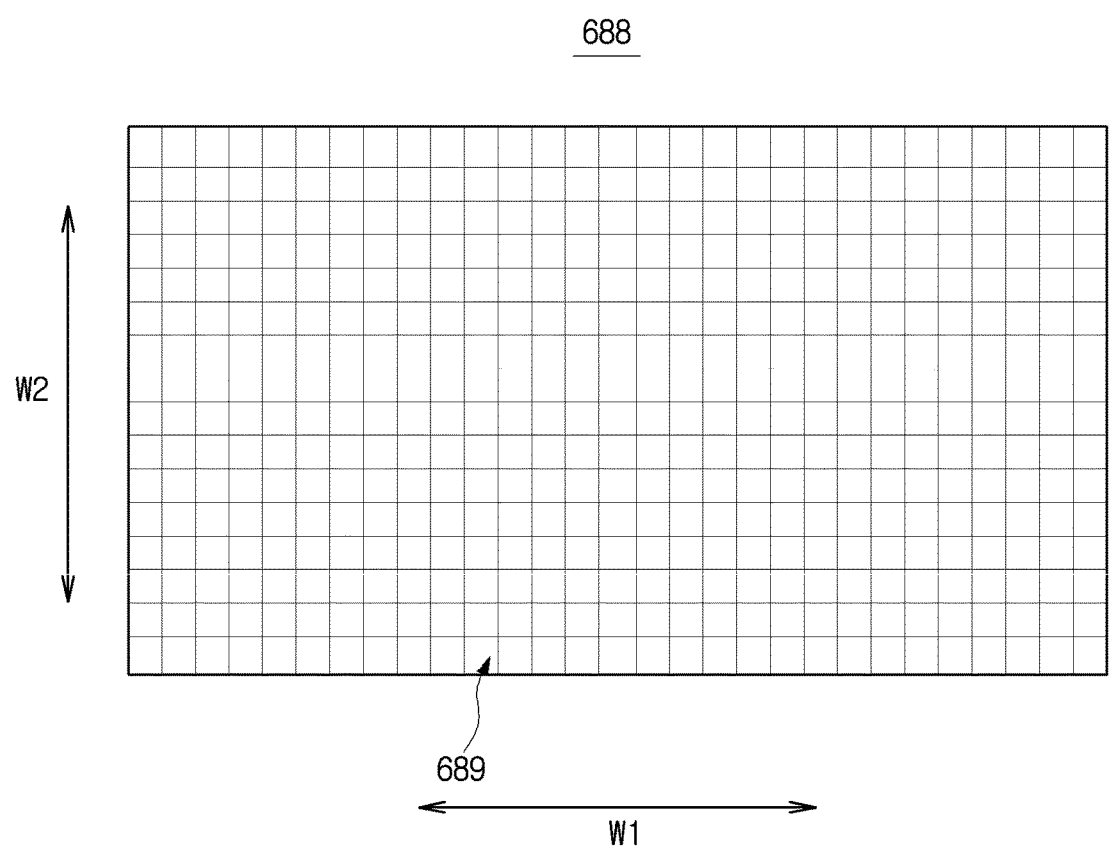
FIGS. 31 and 32 are diagrams illustrating a pattern portion of a bottom chassis according to another exemplary embodiment.
Figure 32:
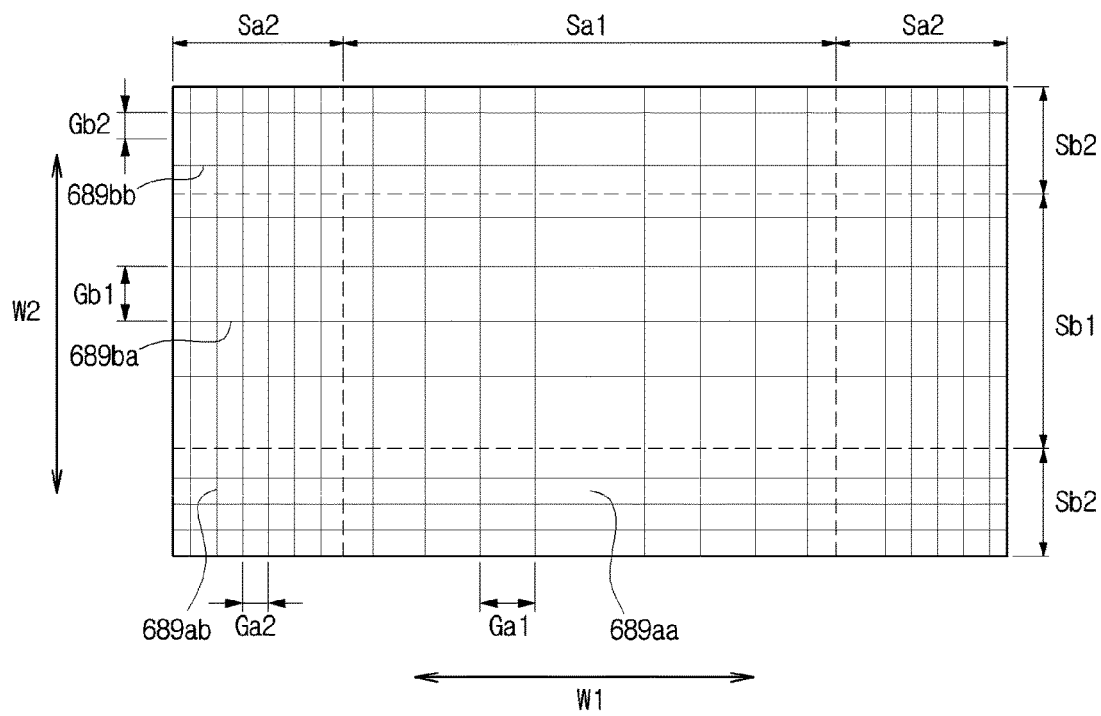

FIGS. 31 and 32 are diagrams illustrating a pattern portion of a bottom chassis according to another exemplary embodiment.

Some patterns of a pattern portion 689 may be arranged in a first direction W1 and extended in a second direction W2 different from the first direction W1 in at least one portion of a bottom chassis 688 such that the bottom chassis 688 has a curvature in the first direction W1. Another pattern of the pattern portion 689 may be arranged in the second direction W2 and extended in the first direction W1 different from the second direction W2 in at least one portion of the bottom chassis 688 such that the bottom chassis 688 has a curvature in the second direction W2. That is, the pattern portion 689 may be formed to extend in the first direction W1 and second direction W2.

The first direction W1 and the second direction W2 are not the same but different from each other. According to the present exemplary embodiment, the pattern portion 689 may be formed on the bottom chassis 688 such that the first direction W1 is perpendicular to the second direction W2.

The pattern portion 689 may be formed using engraved patterns. A plurality of engraved patterns may be arranged in the first direction W1 and second direction W2 in at least one portion of the bottom chassis 688.

Although the pattern portion 689 is formed using lines arranged in parallel according to the present exemplary embodiment, the shape of the pattern portion 689 is not limited thereto.

When the pattern portion 689 is formed on the plate 687 and one surface of the plate 687 on which the pattern portion 689 is formed is bent, the plate 689 has a curvature resulting in preparing the bottom chassis 688 having a curvature.

The pattern portion 689 of the bottom chassis 688 may be divided into sections having different shapes, different pitches between the plurality of engraved patterns, and different depths of the engraved patterns. The curvature increases as the pattern portion 689 has deeper engraved patterns and as the pitch between the engraved patterns decreases.

While the pattern portion 689 may be formed using patterns arranged at constant intervals in all sections such that the sections of the bottom chassis 688 have the same curvature as illustrated in FIG. 31, the sections of the bottom chassis 688 may have different curvatures as illustrated in FIG. 32.

The bottom chassis 688 may have a first horizontal section Sa1 located in the middle of the bottom chassis 688 in the first direction W1, second horizontal sections Sa2 located adjacent to the first horizontal section Sa1, a first vertical section Sb1 located in the middle of the bottom chassis 688 in the second direction W2, and second vertical sections Sb2 located adjacent to the first vertical section Sb1. A pair of the second horizontal sections Sa2 and a pair of the second vertical sections Sb2 may be disposed at both sides of the first horizontal section Sa1 and the first vertical section Sb1, respectively.

A radius of curvature Ra1 of the first horizontal section Sa1 may be greater than a radius of curvature Ra2 of the second horizontal sections Sa2. In addition, a radius of curvature Rb1 of the first vertical section Sb1 may be greater than a radius of curvature Rb2 of the second vertical sections Sb2.

Particularly, when patterns of the first horizontal section Sa1 are referred to as a first horizontal pattern portion 689*aa*, and patterns of the second horizontal sections Sa2 are referred to as a second horizontal pattern portion 689*ab*, the first horizontal pattern portion 689*aa* may be formed to have a pitch with a first horizontal interval Ga1, and the second horizontal pattern portion 689*ab* may be formed to have a pitch with a second horizontal interval Ga2 smaller than the first horizontal interval Ga1. In addition, when patterns of the first vertical section Sb1 are referred to as a first vertical pattern portion 689*ba*, and patterns of the second vertical sections Sb2 are referred to as a second vertical pattern portion 689*bb*, the first vertical pattern portion 689*ba* may be formed to have a pitch with a first vertical interval Gb1, and the second vertical pattern portion 689*bb* may be formed to have a pitch with a second vertical interval Gb2 smaller than the first vertical interval Gb1.

Although the radius of curvature Ra1 of the first horizontal section Sa1 is greater than the radius of curvature Ra2 of the second horizontal sections Sa2, they are not limited thereto. For example, the radius of curvature Ra1 may be the same as or smaller than the radius of curvature Ra2.

Although the radius of curvature Rb1 of the first vertical section Sb1 is greater than the radius of curvature Rb2 of the second vertical sections Sb2, they are not limited thereto. For example, the radius of curvature Rb1 may be the same as or smaller than the radius of curvature Rb2.

For descriptive convenience, the curvature was described based on the pitch intervals of the first horizontal pattern portion 689*aa* and the second horizontal pattern portion 689*ab* and the pitch intervals of the first vertical pattern portion 689*ba* and the second vertical pattern portion 689*bb*. However, the curvature of the sections may vary according to the depth of the engraved patterns or the shape of the engraved patterns.

The pattern portion 689 may be formed using lines arranged in parallel. The pattern portion 689 may also be formed as parallel lines perpendicular to a direction having a curvature. The flat plate 687 has a curved surface by using the pattern portion 689, thereby forming the curved bottom chassis 688.

Hereinafter, a method of manufacturing the bottom chassis 688 will be described.

The pattern portion 689 is formed on one surface of the plate 687 using some patterns arranged in the first direction W1 and extending in the second direction W2 and another pattern arranged in the second direction W2 and extending in the first direction W1. According to the present exemplary embodiment, the first direction W1 is perpendicular to the second direction W2.

The pattern portion 689 is formed on the plate 687 and the surface of the plate 687 on which the pattern portion 689 is formed is plastically deformed by bending the surface, thereby forming the bottom chassis 688 having a curvature. The pattern portion 689 may be formed using a plurality of engraved patterns having a linear shape and arranged in parallel.

As described above, the pattern portion 689 may have the first horizontal pattern portion 689*aa* having a pitch with the first horizontal interval Ga1 in the first horizontal section Sa1 and the second horizontal pattern portion 689*ab* having a pitch with the second horizontal interval Ga2 smaller than the first horizontal interval Ga1 in the second horizontal sections Sa2. The pattern portion 689 may also have the first vertical pattern portion 689*ba* having a pitch with the first vertical interval Gb1 in the first vertical section Sb1 and the second vertical pattern portion 689*bb* having a pitch with the second vertical interval Gb2 smaller than the first vertical interval Gb1 in the second vertical sections Sb2.

In order to obtain different pitches in different sections, a speed of the punching process or a moving speed of the plate 687 may be changed. Particularly, the speed of the punching process or the moving speed of the plate 687 may be reduced in the first horizontal section Sa1 and the first vertical section Sb1, and the speed of the punching process or the moving speed of the plate 687 may be increased in the second horizontal sections Sa2 and the second vertical sections Sb2 to obtain the results described above.

For descriptive convenience, the pattern portion 689 was described based on the pitch intervals. However, the curvature thereof may be modified by changing the depth or shape of the engraved pattern. In this case, the depth of the engraved patterns may be modified by changing intensity of the punching process or the shape of the engraved patterns may be modified by changing the type of the punching tool 687*a*.

Hereinafter, another exemplary embodiment will be described.

In this regard, description presented above will not be repeated.

Figure 33:
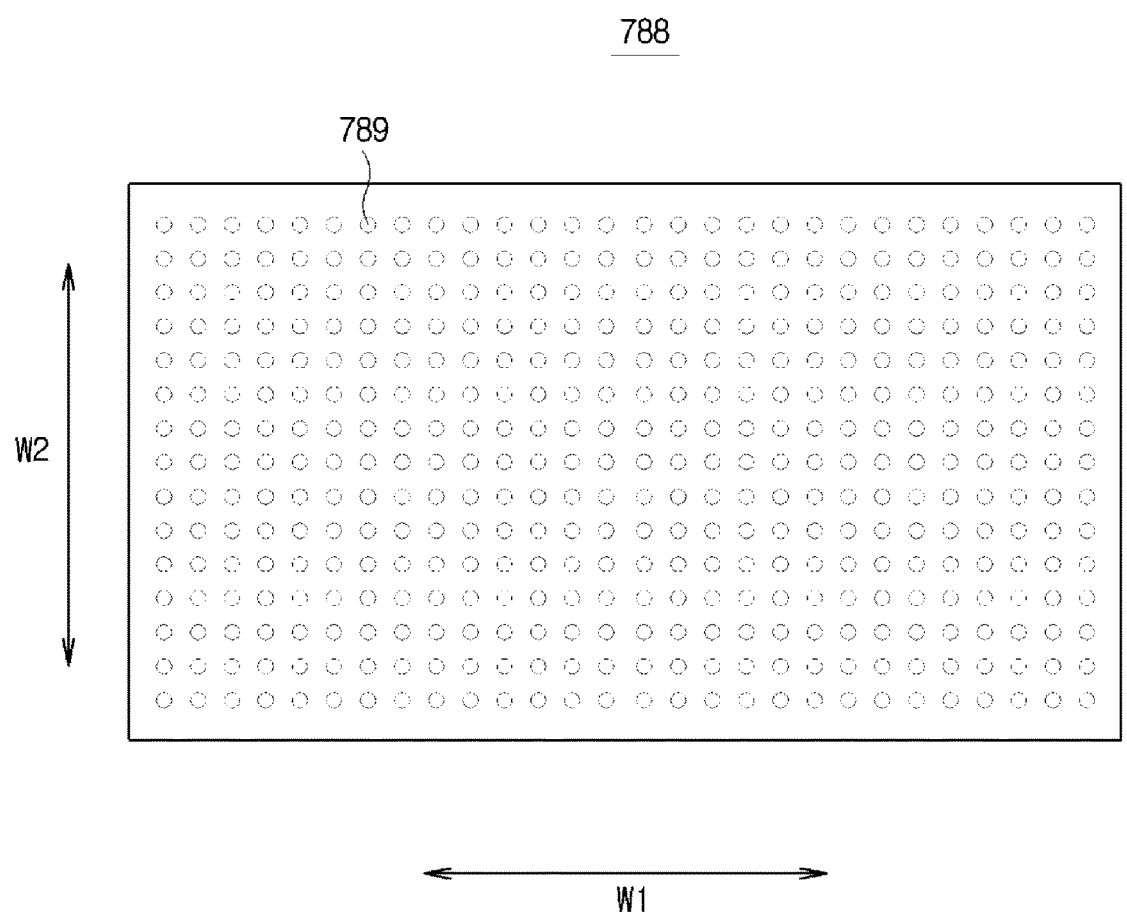
FIGS. 33 and 34 are diagrams illustrating a pattern portion of a bottom chassis according to another exemplary embodiment.
Figure 34:
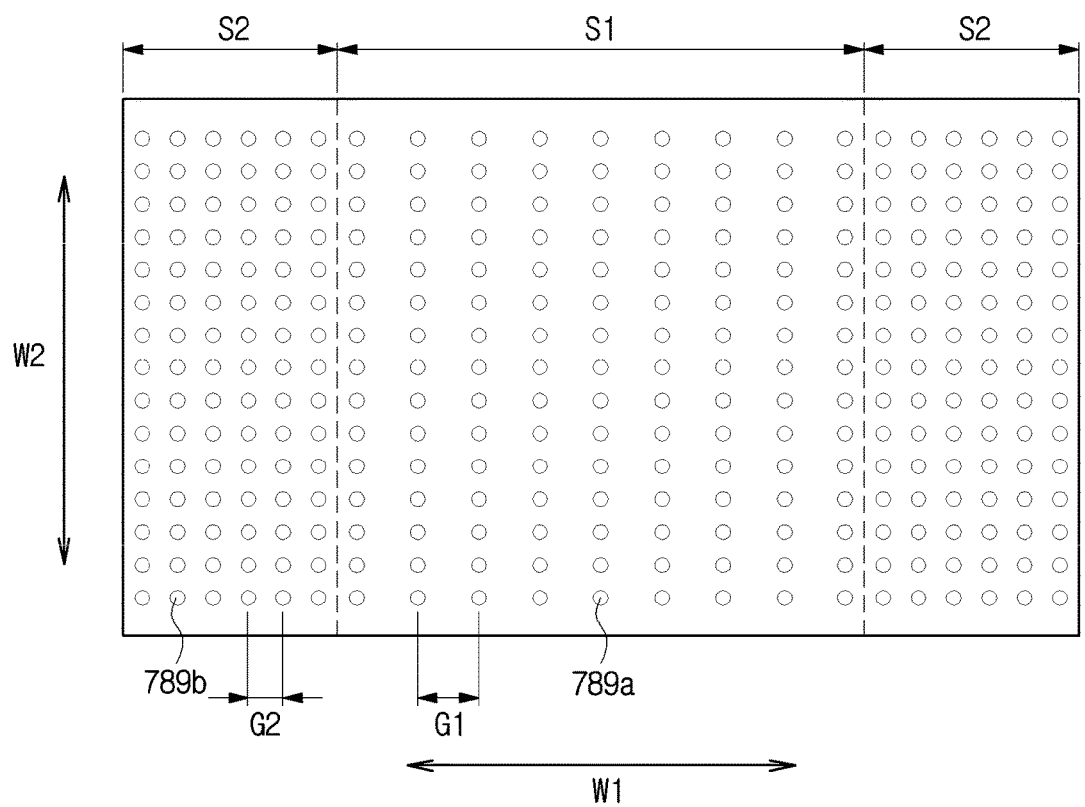

FIGS. 33 and 34 are diagrams illustrating a pattern portion of a bottom chassis according to another exemplary embodiment.

A pattern portion 788 may be formed using dot patterns.

The pattern portion 789 of a bottom chassis 788 may be divided into sections having different shapes, different pitches between a plurality of engraved patterns, and different depths of the engraved patterns. The curvature increases as the pattern portion 789 has deeper engraved patterns and as the pitch between the plurality of engraved patterns decreases.

While the pattern portion 789 may be formed using patterns arranged at constant intervals having the same curvature in all sections on the bottom chassis 788 as illustrated in FIG. 33, the sections may have different curvatures as illustrated in FIG. 34.

The bottom chassis 788 may have a first section S1 located in the middle of the bottom chassis 788 in the first direction W1 and second sections S2 located adjacent to the first section S1. A pair of second sections S2 may be disposed at both sides of the first section S1.

A radius of curvature R1 of the first section S1 may be greater than a radius of curvature R2 of the second sections S2.

Particularly, when patterns of the first section S1 are referred to as a first pattern portion 789*a*, and patterns of the second sections S2 are referred to as a second pattern portion 789*b*, the first pattern portion 789*a* may be formed to have a pitch with a first interval G1, and the second pattern portion 789*b* may be formed to have a pitch with a second interval G2 smaller than the first interval G1.

Although the radius of curvature R1 of the first section S1 is greater than the radius of curvature R2 of the second sections S2, they are not limited thereto. For example, the radius of curvature R1 may be the same as or smaller than the radius of curvature R2.

For descriptive convenience, the curvature was described based on the pitch intervals of the first pattern portion 789*a* and the second pattern portion 789*b*. However, the curvature of the sections may vary according to the depth of the engraved patterns or the shape of the engraved patterns.

Hereinafter, another exemplary embodiment will be described.

In this regard, description presented above will not be repeated.

Figure 35:
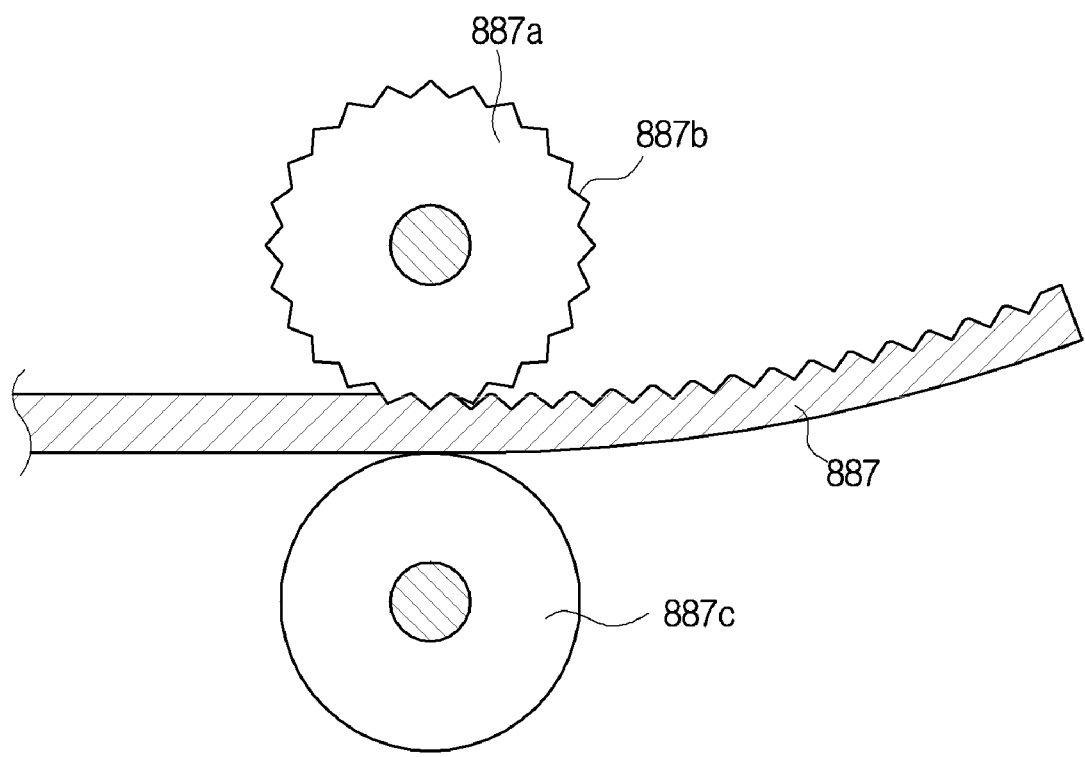
FIG. 35 is a diagram for describing manufacturing of a bottom chassis according to another exemplary embodiment.

FIG. 35 is a diagram for describing manufacturing of a bottom chassis according to another exemplary embodiment.

Although the pattern portion 589 may be formed using various methods, a punching roller 887*a* may be used according to the present exemplary embodiment.

The punching roller 887*a* is disposed on one surface of a plate 887, and a support roller 887*c* is disposed on the other surface of the plate 887 at a punching-processed region.

While the punching roller 887*a* and the support roller 887*c* rotate on both surfaces of the plate 887, the pattern portion 589 is formed on the one surface of the plate 887. Particularly, the punching roller 887*a* rotates counterclockwise and the support roller 887*c* rotates clockwise referring to FIG. 35, such that the pattern portion 589 is formed on the one surface of the plate 887.

The punching roller 887*a* rotates on the plate 887 in the first direction W1 about a central shaft disposed in the second direction W2 and has pattern protrusions 887*b* formed in the second direction W2.

As described above, the pattern portion 589 may have the first pattern portion 589*a* having a pitch with the first interval G1 in the first section S1 and the second pattern portion 589*b* having a pith with the second interval G2 smaller than the first interval G1 in the second section S2.

Different pitches may be obtained in different sections as described above by changing intervals of the pattern protrusions 887*b* along a circumferential direction of the punching roller 887*a*. Although the pattern portion 589 is described above based on the intervals of the pattern protrusions 887*b*, the depth of the engraved patterns may be modified by changing the size of the pattern protrusions 887*b*, or the shape of the engraved patterns may be modified by changing the shape of the pattern protrusions 887*b*.

As is apparent from the above description, the display apparatus according to exemplary embodiments may have a slim or thin design by modifying the structure thereof.

The display apparatus may be manufactured with high productivity by modifying the assembling structure thereof.

The display apparatus may have an aesthetically appealing appearance by achieving the slim or thin design.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A display apparatus comprising:
   a display panel having a front surface and a rear surface;
   a light source unit comprising a light source configured to generate light and a light source supporting unit on which the light source is disposed;
   a light guide plate disposed at a rear portion of the display panel and configured to transmit the light generated by the light source toward the display panel; and
   a side frame having a frame body and a frame seating portion extending from the frame body,
   wherein the light source supporting unit supports at least one portion of a front surface of the light guide plate,
   wherein a first surface of the light source supporting unit supports the display panel, and a second surface of the light source supporting unit supports the light guide plate, the first surface being opposite to the second surface, and
   wherein the frame seating portion extends from the frame body along the second surface of the light source supporting unit, and a portion of the second surface of the light source supporting unit is seated on the frame seating portion of the side frame.

2. The display apparatus according to claim 1, wherein the light source supporting unit comprises:
   a supplementary member disposed on the light guide plate supporting surface to prevent light emitted from the light source from leaking through a gap between the light guide plate supporting surface and the light guide plate.

3. The display apparatus according to claim 1, wherein the light source supporting unit comprises a printed circuit board (PCB) configured to transmit an electric signal to the light source.

4. The display apparatus according to claim 1, further comprising an optical sheet disposed between the light guide plate and the display panel, the optical sheet configured to change optical properties of light transmitted from a light transmitting surface of the light guide plate.

5. The display apparatus according to claim 1, wherein the rear surface of the display panel is disposed to face a light transmitting surface of the light guide plate and to receive the light transmitted through the light transmitting surface of the light guide plate.

6. The display apparatus according to claim 5, wherein the light source is disposed on the second surface of the light source supporting unit.

7. The display apparatus according to claim 1, further comprising:
   a top chassis; and
   a bottom chassis disposed at a rear portion of the light guide plate to support the light guide plate,
   wherein the at least one portion of the side frame is disposed between the top chassis and the bottom chassis, and
   wherein the top chassis is coupled with the light source supporting unit and the side frame.

8. The display apparatus according to claim 7, wherein the bottom chassis is integrally formed with the side frame.

9. The display apparatus according to claim 7, wherein the top chassis comprises:
   a panel supporting portion; and
   a top chassis coupling portion,
   wherein the top chassis coupling portion is coupled with the side frame in a front-to-back direction without interfering with the bottom chassis.

10. The display apparatus according to claim 7, wherein the top chassis comprises:
    a panel supporting portion; and
    a top chassis coupling portion,
    wherein the top chassis coupling portion, the light source supporting unit, and the side frame are sequentially disposed.

11. The display apparatus according to claim 10, wherein the top chassis coupling portion, the light source supporting unit, and the side frame are fixed by screw-coupling.

12. The display apparatus according to claim 10, wherein the top chassis coupling portion comprises an insertion space configured to receive a screw to couple to the top chassis coupling portion, the light source supporting unit, and a frame seating portion, the insertion space being recessed toward the bottom chassis relative to the panel supporting portion, and the display apparatus further comprises a cover, at least one portion of which covers the insertion space, disposed on the front surface of the top chassis.

13. The display apparatus according to claim 10, wherein the cover comprises a magnetic material, and
the display apparatus further comprises a magnet inserted into the insertion space to allow the cover to be attached to the front surface of the top chassis.

14. A display apparatus comprising:
a display panel;
a light source unit comprising a light source configured to generate light and a light source supporting unit on which the light source is disposed; and
a light guide plate disposed at a rear portion of the display panel and configured to transmit the light generated by the light source toward the display panel,
wherein the light source supporting unit supports at least one portion of a front surface of the light guide plate, and
wherein the light source supporting unit comprises:
a light guide plate supporting surface facing the light guide plate to support the light guide plate; and
a supplementary member disposed on the light guide plate supporting surface to prevent light emitted from the light source from leaking through a gap between the light guide plate supporting surface and the light guide plate, and
wherein the supplementary member comprises a heat insulation film.

* * * * *